US012007089B2

(12) United States Patent
Seichter et al.

(10) Patent No.: US 12,007,089 B2
(45) Date of Patent: Jun. 11, 2024

(54) REFLECTOR OPTICS FOR A VEHICLE RETROFIT HEADLAMP

(71) Applicant: OSRAM GmbH, Munich (DE)

(72) Inventors: Christian Seichter, Herbrechtingen (DE); Kevin Bayer, Heidenheim (DE); Hans Guenter Mayer, Hermaringen (DE); Ralf Lindner, Neresheim (DE)

(73) Assignee: OSRAM GmbH, Munich (DE)

( * ) Notice: Subject to any disclaimer, the term of this patent is extended or adjusted under 35 U.S.C. 154(b) by 6 days.

(21) Appl. No.: 17/907,019

(22) PCT Filed: Mar. 22, 2021

(86) PCT No.: PCT/EP2021/057225
§ 371 (c)(1),
(2) Date: Sep. 22, 2022

(87) PCT Pub. No.: WO2021/191130
PCT Pub. Date: Sep. 30, 2021

(65) Prior Publication Data

US 2023/0194064 A1 Jun. 22, 2023

(30) Foreign Application Priority Data

Mar. 23, 2020 (DE) ..................... 10 2020 203 733.7

(51) Int. Cl.
*F21S 41/33* (2018.01)
*F21S 41/148* (2018.01)
(Continued)

(52) U.S. Cl.
CPC ........... *F21S 41/333* (2018.01); *F21S 41/148* (2018.01); *F21S 41/365* (2018.01); *F21S 45/47* (2018.01)

(58) Field of Classification Search
CPC ...... F21S 41/365; F21S 41/143; F21S 41/151; F21S 41/192; F21S 43/40; F21S 43/315;
(Continued)

(56) References Cited

U.S. PATENT DOCUMENTS 6,722,777 B2 4/2004 Erber
2004/0141323 A1 * 7/2004 Aynie .................... F21S 43/245 362/308
(Continued)

FOREIGN PATENT DOCUMENTS

CN 207438161 U 6/2018
DE 102016204181 A1 9/2017
(Continued)

OTHER PUBLICATIONS

"Concerning the adoption of uniform technical precriptions for wheeled vehicles, equipment and parts which can be fitted and/or be used on wheeled vehicles and the conditions for reciprocal recognition of approvals granted on the basis of these prescriptions," Agreement, Addendum 36: Regulation No. 37, Revision 7, E/ECE/324Rev.1/Add.36/Rev.7-E/ECE/TRANS/505/Rev.1/Add.36/Rev.7, Jul. 3, 2012, 188 pages.

*Primary Examiner* — Omar Rojas Cadima
(74) *Attorney, Agent, or Firm* — Slater Matsil, LLP

(57) ABSTRACT

In an embodiment a reflector optical system includes a reflector body having a rotational symmetry about a longitudinal axis and including a first reflector optic portion having a substantially concave shape and a second reflector optic portion extending along the longitudinal axis, the first reflector optic portion facing the second reflector optic portion, wherein the first reflector optic portion includes a plurality of first reflective surfaces and the second reflector
(Continued)

optic portion includes a plurality of second reflective surfaces in spaced light-receiving relation to the plurality of first reflective surfaces.

20 Claims, 16 Drawing Sheets

(51) Int. Cl.
*F21S 41/365* (2018.01)
*F21S 45/47* (2018.01)

(58) Field of Classification Search
CPC .. F21S 43/00; F21S 41/24; F21S 41/26; F21S 41/30; F21S 41/322; F21S 43/237; F21S 43/241; F21S 43/249; F21S 43/251; F21S 43/247; F21Y 2115/10; F21V 7/0091; B60Q 1/0011; B60Q 1/381; B60Q 3/66; F21W 2103/20
See application file for complete search history.

(56) References Cited

U.S. PATENT DOCUMENTS

| | | | | |
|---|---|---|---|---|
| 2006/0061990 | A1 * | 3/2006 | Chinniah | F21K 9/00 362/247 |
| 2016/0146431 | A1 | 5/2016 | Koizumi | |
| 2017/0268740 | A1 | 9/2017 | Boenigk | |

FOREIGN PATENT DOCUMENTS

| | | | | |
|---|---|---|---|---|
| EP | 1300626 | A2 | 4/2003 | |
| EP | 2671755 | A1 | 12/2013 | |
| EP | 3343093 | A1 | 7/2018 | |
| TW | 201339473 | A | 10/2013 | |
| WO | 2011111476 | A1 | 9/2011 | |
| WO | WO-2017220394 | A1 * | 12/2017 | F16C 32/0442 |

* cited by examiner

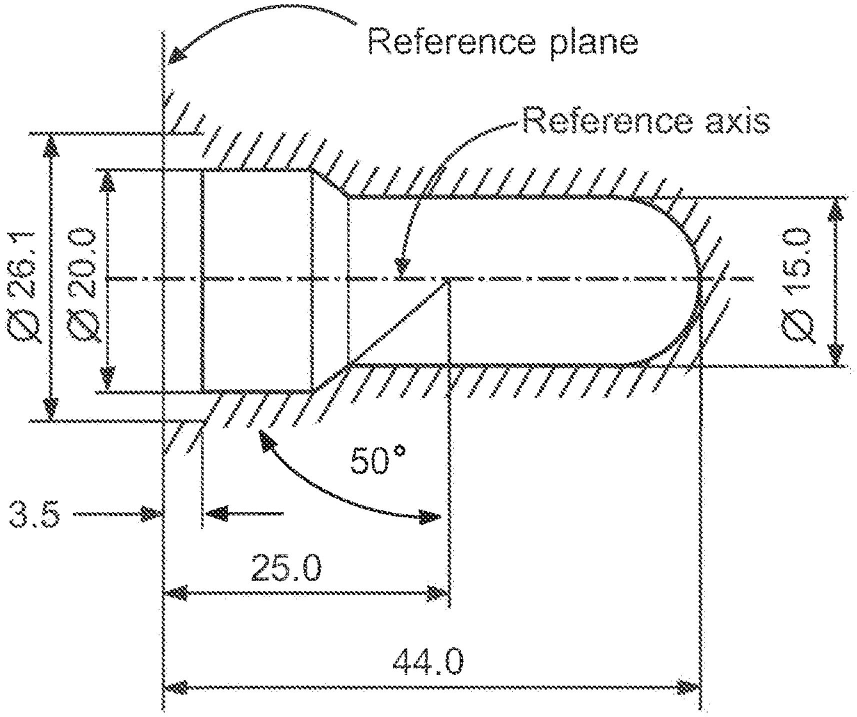
Fig. 25 ( State of the Art )
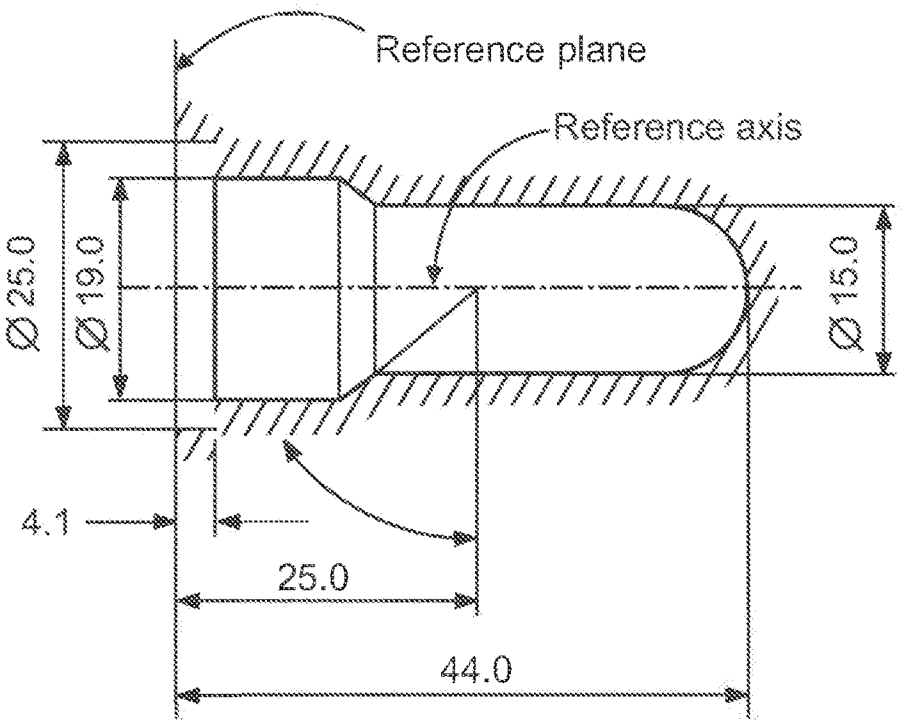
Fig. 26 ( State of the Art )

REFLECTOR OPTICS FOR A VEHICLE RETROFIT HEADLAMP

This application is a national stage entry according to 35 U.S.C. § 371 of PCT Application No. PCT/EP2021/057225 filed on Mar. 22, 2021, which claims priority to German national patent application No. 10 2020 203 733.7, filed Mar. 23, 2020, the disclosure of which is incorporated herein by reference in its entirety.

TECHNICAL FIELD

Various embodiments relate generally to solid-state headlamps for power-driven vehicles or also to reflector-optical systems for such lamps, by means of which the light emitted, for example, by solid-state light sources in the lamps, can be suitably radiated into the space surrounding the lamps. Further aspects may relate to retrofit lamps intended to replace conventional halogen based headlamps in vehicle headlights.

BACKGROUND

Retrofit lamps with solid-state light sources are very popular, particularly in the field of replacing lamps in vehicles, especially power-driven vehicles, because they offer inexpensive alternatives, greater flexibility with regard to the colour temperatures that can be displayed, durability and, above all, energy savings, etc., than conventional halogen based headlamp, for example. Retrofit replacement lamps, for example, regularly have the same type of socket, etc. as the halogen based headlamps they are intended to replace, so that no further adjustments need to be made to the specific headlamp design.

However, from a photometric point of view, there are certain requirements regarding the way in which, for example, the solid angle area in front of a vehicle may be illuminated by low beam, high beam, fog light, daytime running light, etc. (solid angle-related radiation characteristic). For conventional halogen based headlamps, therefore, the design of the reflector accommodating the lamp and the positioning and design of the lamp in the reflector are particularly important.

It is therefore desirable to offer uniform technical specifications, at least to the various manufacturers, for certain types of lamps to be installed in the corresponding headlights, so that the required profile of ambient illumination is obtained for lamps within the specifications in the specific headlight.

To this end, international organizations such as the United Nations Economic Commission for Europe (UNECE or UN/ECE), for example, have created regulations with regard to “filament light sources for use in approved lamps of power-driven vehicles and of their trailers”, in this case, for example, the corresponding ECE Addendum 36: Regulation No. 37 (rev. 7) to the underlying Geneva Convention of Mar. 20, 1958, which contains, among other things, technical regulations, test procedures, conditions for type approval, ECE approval marks and conditions for ensuring conformity of production for incandescent or halogen lamps, see ECE Addendum 36: Regulation No. 37 (rev. 7), pages 35-46, 50-53 and 70-73. The regulations are recommendations that can be integrated by the respective contracting states into their national law. For example, they also specify exact ranges and tolerances for filament positioning within the respective lamp, or certain luminous fluxes to be achieved.

In the case of solid-state light sources, however, there are still hurdles, particularly for dipped-beam or main-beam applications. On the one hand, these are based on the fact that fluorescent-converting solid-state light sources radiate essentially Lambertian into a half-space, so that the positioning of corresponding circuit boards as supporting elements for the light sources in the lamp can entail symmetry problems with regard to the resulting radiation characteristics, since the surrounding reflector could not be irradiated uniformly. In the simplest case, light sources radiate into respective half-spaces from both sides of a printed circuit board placed in the translucent housing. Corresponding arrangements and geometries of the supporting elements also make it difficult to comply with ECE standards, since the fine positioning of the filament of the conventional halogen based headlamp as a light emission area should also be met by the lamps based on solid-state light sources. On the other hand, problems of thermal management or the resulting material fatigue may therefore also remain unsolved if a sufficiently large number of light sources are positioned closely to obtain the required luminous fluxes.

Lamps based on solid-state light sources for use in power-driven vehicles, among others, are described in U.S. Pat. Nos. 7,110,656 B2, 8,807,808 B2, 10,119,676 B2, 10,253,941 B2, 10,415,762 B2 or US 2010/0213809 A1. Further examples of retrofit lamps are described in U.S. Pat. No. 10,436,408 B2 or CN 207438161 U. Furthermore, a retrofit lamp based on solid-state light sources is also described in U.S. Pat. No. 9,677,753 B2. To the knowledge of the inventors of the present application, there is currently no commercially available LED retrofit lamp, nor any of the lamps presented in the prior art literature or patent literature, which could comply with the standardized specifications for the performance of vehicle headlamp low beam or high beam such as those in ECE Addendum 36: Regulation No. 37, or which could at least suggest such compliance.

DE 10 2008 056 049 A1 discloses a lighting device for motor vehicles comprising LEDs which radially deflects a light emitted by the LEDs in the longitudinal direction at a relatively large beam angle. For this purpose, an attachment optic is provided which has a reflection face and, in combination with a light emitting surface of the attachment optic, produces a light emission which, when the rays are traced back, produces a focal cloud at the position corresponding to the position of a conventional filament. The combination of the reflection face and the exit surface of the attachment optics is designed in such a way that a main reflector of the headlamp in question is fully illuminated over its entire effective solid angle range.

DE 10 2016 204 181 A1 and US 2017/268740 A1, respectively, also describe a retrofit lamp for vehicle headlights with two solid-state light sources in the form of LED chips, a light extraction optic and a light guide that guides light from the solid-state light sources to the light extraction optics. The light extraction optics are light-reflecting and can have first, second and third cone-shaped or frustoconical sections, e.g. of aluminum, the former of which can be enclosed by the material of the light guide. The light extraction optic is designed to be continuously tapered starting from the distal end in the direction of the solid-state light sources. The retrofit lamp replaces high-pressure discharge lamps, e.g. of ¬ECE category D5S.

DE 10 2018 216 187 A1 discloses a retrofit lamp with a lamp vessel. A solid-state light source, a rod-shaped light wavelength conversion element offset parallel and laterally to the longitudinal axis of the lamp vessel, and a reflection face are arranged in the lamp vessel. The reflection face can reflect light from the solid-state light source to the rod-shaped light wavelength conversion element. The rod-shaped light wavelength conversion element emits the light reflected from the reflection face and wavelength-converted by itself, so that it can produce a light distribution similar to that of a halogen incandescent lamp whose filament is aligned parallel to the longitudinal axis of the lamp vessel, and also serves as a support for a reflector having the reflection face. The retrofit lamp can serve as a replacement for a halogen incandescent lamp of ECE category H7, H8, H9, H11 or H16.

In US 2017/356616 A1 and U.S. Pat. No. 10,119,676 B2, respectively, a lighting device for power-driven vehicles is described, which has an LED as a light radiation source, a light-transmitting body with a collimator opposite the LED, and a tapered section that directs the light radiation received by the collimator to a distal section. There, an output mirror is set up with a shaft section and a head section that acts as an emission filament. The output mirror reflects the light radiation radially away from the longitudinal axis as well as proximally toward the light radiation source. Such an illumination device is intended to be capable of reproducing the light emission characteristics of, for example, an H11 lamp.

SUMMARY

Embodiments provide an improvement through a simple structure, an increase in luminous flux and/or an optimization of thermal management.

According to an embodiment, a solid-state headlamp for a power-driven vehicle is proposed, which has a lamp body extending in a longitudinal direction. The lamp body has a rear base portion and a front portion in which primarily light emission takes place. Further, the lamp body has a support member configured, for example, as a printed circuit board (PCB) and a light-transmissive housing. A plurality of solid-state light sources arranged on the support member at the rear base section are operated by a drive circuitry in the case of power supply.

The lamp body further comprises a reflector optics disposed at the front portion. The solid-state light sources are adapted to emit light toward the reflector optics, the reflector optics comprising a first reflector optic portion and a second reflector optic portion. The first reflector optic portion is adapted to receive light emitted from the solid-state light sources and emit the light toward the second reflector optic portion. The second reflector optic portion is, in turn, configured to reflect or receive the light reflected from the first reflector optic portion and then emit the light through the light-transmissive housing. Each of a plurality of first reflective surfaces disposed on the first reflector optic portion may extend in an annular region around the longitudinal axis extending through the lamp body from the solid-state light sources toward the first reflector optic section.

Such a structure allows to position the support member and the light sources at the rear base portion and to reflect the emitted light by means of the annularly arranged first reflecting surfaces onto the second reflector optic portion, if necessary also in a focusing manner, which can thus be positioned in a limited spatial area along the longitudinal axis similar to a filament in conventional halogen headlamps and thus hardly shaded. The positioning of the solid-state light sources at the rear base portion improves heat dissipation there.

By having a plurality of first reflective surfaces, irradiation of the surface or surfaces of the second reflector optic portion can be controlled as homogeneously as possible, and the cost of manufacturing the reflector optics can be kept within limits. For example, each of the first reflective surfaces may be configured to irradiate a particular portion of the second reflector optic portion by reflection so that the distribution of light contributions across the second reflector optic portion can be accurately adjusted in design. At the same time, the geometries required for the first reflective surfaces can be easily and accurately fabricated in actual mass production. Furthermore, this design avoids emission losses due to absorption of light within the lamp.

According to another embodiment, a reflector optical system for an automotive headlamp is provided. The system comprises a reflector body provided with rotational symmetry about a longitudinal axis, the reflector body having a first reflector optic portion with a substantially concave shape. Further, the system comprises a second reflector optic portion extending along the longitudinal axis, the first reflector optic portion facing the second reflector optic portion. Further, the first reflector optic portion includes a plurality of first reflective surfaces and the second reflector optic portion includes a plurality of second reflective surfaces. The second reflective surfaces are in spatial light receiving relationship with the first reflective surfaces. For example, with respect to a light incident on the first reflective surfaces from a particular direction, the light may be reflected therefrom such that the reflected light is incident on the second reflective surfaces exactly, or at least in a proportion relevant to the purpose, and is reflected or emitted therefrom again. According to preferred embodiments, the spaced light-receiving relation may also exist between each of the first reflecting surfaces and the second reflecting surfaces, but this is not needed.

This design achieves the same or similar advantages as described above. The assignment of the reflecting surfaces ensures that a light emitted onto the reflector optics is homogeneously distributed and incident on the second reflector optic portion. As a result, heat peaks that cannot be avoided there are at least reduced, while heat dissipation is improved. The second reflective surfaces enable high reflectivity, homogeneous distribution of local light emission or light reflection across the second reflector optic portion, and allow cost reduction in manufacturing if a simple geometry is used.

Moreover, especially with regard to the plurality of second reflecting surfaces in the second reflector optic section, this structure enables a structure and a lamp design that can functionally correspond to that of conventional halogen headlamps, because the second reflector optic section can assume a position and a dimension (length and/or diameter) as provided for filament bodies in the relevant standards, for example, ECE Addendum 36: Regulation No. 37 (rev. 7) of Jul. 3, 2012, which is incorporated herein by reference in its entirety, see there. e.g. pages 38, 42, 46, 53, 73. This makes it possible, with particular advantage, to use this reflector optic also in solid-state retrofit headlamps, if necessary.

According to another embodiment, a solid-state headlamp for a power-driven vehicle comprises a lamp body extending in a longitudinal direction. The lamp body has a rear base portion and a front portion in which primarily light emission occurs. Further, the lamp body has a support member and light-transmissive housing. A plurality of solid-state light sources disposed on the support member at the rear base portion are driven by a drive circuitry in the case where electric power is supplied. The solid-state light sources then cause the solid-state lamp to emit light through the light transmissive housing during operation.

The power converted into light radiation thereby causes:

(a) a luminous flux of at least 1500 lumens+/−10% when supplied with a test voltage of 13.2 volts, or of at least 1750 lumens+/−10% when supplied with a test voltage of 28 volts, the lamp (10) not spatially extending in its external dimensions beyond an envelope as shown in FIG. 2 on page 35 of Addendum 36: ECE Regulation 37 (dated 3 Jul. 2012) for a lamp of the H7 type; or (b) a luminous flux of at least 1350 lumens+/−10% when supplied with a test voltage of 13.2 volts, or at least 1600 lumens+/−10% when supplied with a test voltage of 28 volts, wherein the lamp (10) does not spatially extend in its external dimensions beyond an envelope as shown in FIG. 2 on page 50 of Addendum 36: ECE Regulation 37 (dated 3 Jul. 2012) for a lamp of the H11 type.

According to this embodiment, a solid-state headlamp is therefore proposed which can satisfy at least some of the ECE standard specifications on which halogen headlamps are based, and in particular one which provides correspondingly high values for the luminous flux, so that the solid-state headlamp can even be used as a retrofit lamp, e.g. for generating high beam, low beam, daytime running light or fog light. Nevertheless, it complies with the specifications for external dimensions in accordance with ECE standard specifications, i.e. the external dimensions lie spatially on or within the envelope. The test voltage of 13.2 volts can be used for lamps with a rated voltage of 12 volts, and the test voltage of 28 volts for lamps with a rated voltage of 24 volts. It should be noted that while the embodiment refers to H7 or H11 type headlamps, this embodiment is not limited to specific socket types, but without limitation of generality also includes, for example, H8, H9 or H16 type lamps.

BRIEF DESCRIPTION OF THE DRAWINGS

Further advantages, features and details of the various aspects become apparent from the claims, from the following description of preferred embodiments and from the drawings. In the figures, the same reference signs denote the same features and functions.

FIG. 25 shows a copy of FIG. 2 of ECE Regulation 37 from Addendum 36 (dated 3 Jul. 2012) for a lamp of the H7 type (prior art); and FIG. 26 shows a copy of FIG. 2 of ECE Regulation 37 from Addendum 36 (dated 3 Jul. 2012) for a lamp of the H11 type (prior art).

DETAILED DESCRIPTION OF ILLUSTRATIVE EMBODIMENTS

In the following description of preferred embodiments, it should be understood that the present disclosure of the various aspects is not limited to the details of the structure and arrangement of the components as shown in the following description and drawings. The embodiments may be put into practice or carried out in various ways. It should further be appreciated that the expressions and terminology used herein are used for the purpose of specific description only, and these should not be construed as such in a limiting manner by those skilled in the art.

The solid-state lamp 10 disclosed herein, as well as the corresponding reflector optical system 300, are for use in a power-driven vehicle having an internal combustion engine, a purely electric, fuel cell-, or hybrid drive, etc., and in particular for installation in a reflector cavity for vehicle front illumination such as a vehicle main headlamp or a fog lamp (hereinafter collectively referred to as vehicle headlamp) used for illuminating a road surface. The type of power-driven vehicle may be, without limitation of generality, a passenger car such as a sedan, a station wagon, a sports utility vehicle (SUV), a minivan, a pickup truck, an all-terrain vehicle, a bus or a truck, or a leisure vehicle such as a snowmobile or a motorcycle, and the like. Alternatively, the term "power-driven vehicle" in this disclosure also includes watercraft, such as motorboats, jet skis, or aircraft, such as airplanes or helicopters.

I. Structure of the Solid-State Lamp

FIGS. 1 to 6 show an overview of a solid-state headlamp 10 according to embodiments of the present disclosure. The solid-state headlamp 10 shown herein is of the H7 type (as actually specified for halogen headlights), and the basic structure shown in the figures is generally transferable to other types in accordance with further embodiments, for example to solid-state headlamps of the H8, H9, H11 or H16 type. Accordingly, in FIGS. 1 to 3 and 5 to 6, the socket 20 (PX26d for type H7) is drawn only in dashed lines to emphasize the interchangeability of the socket for the implementation of other types (e.g. PGJ19-1 for type H8; PGJ19-5 for H9; PGJ19-2 for H11 or PGJ19-3 for H16) with an otherwise similar or identical lamp design.

The solid-state headlamp 10 of type H7 described here is suitable, for example, for use in generating high beam or low beam. In the case of type H8, the corresponding solid-state headlamp 10 is suitable for use, for example, for fog lights. In the case of type H9, the corresponding solid-state headlamp 10 is suitable for use, for example, for generating high beam. In the case of type H11, the corresponding solid-state headlamp 10 is suitable for generating, for example, fog light, high beam light or low beam light. Finally, in the case of type H16, the corresponding solid-state headlamp 10 is suitable, for example, for generating fog light. However, alternative applications are equally conceivable.

Figure 1:
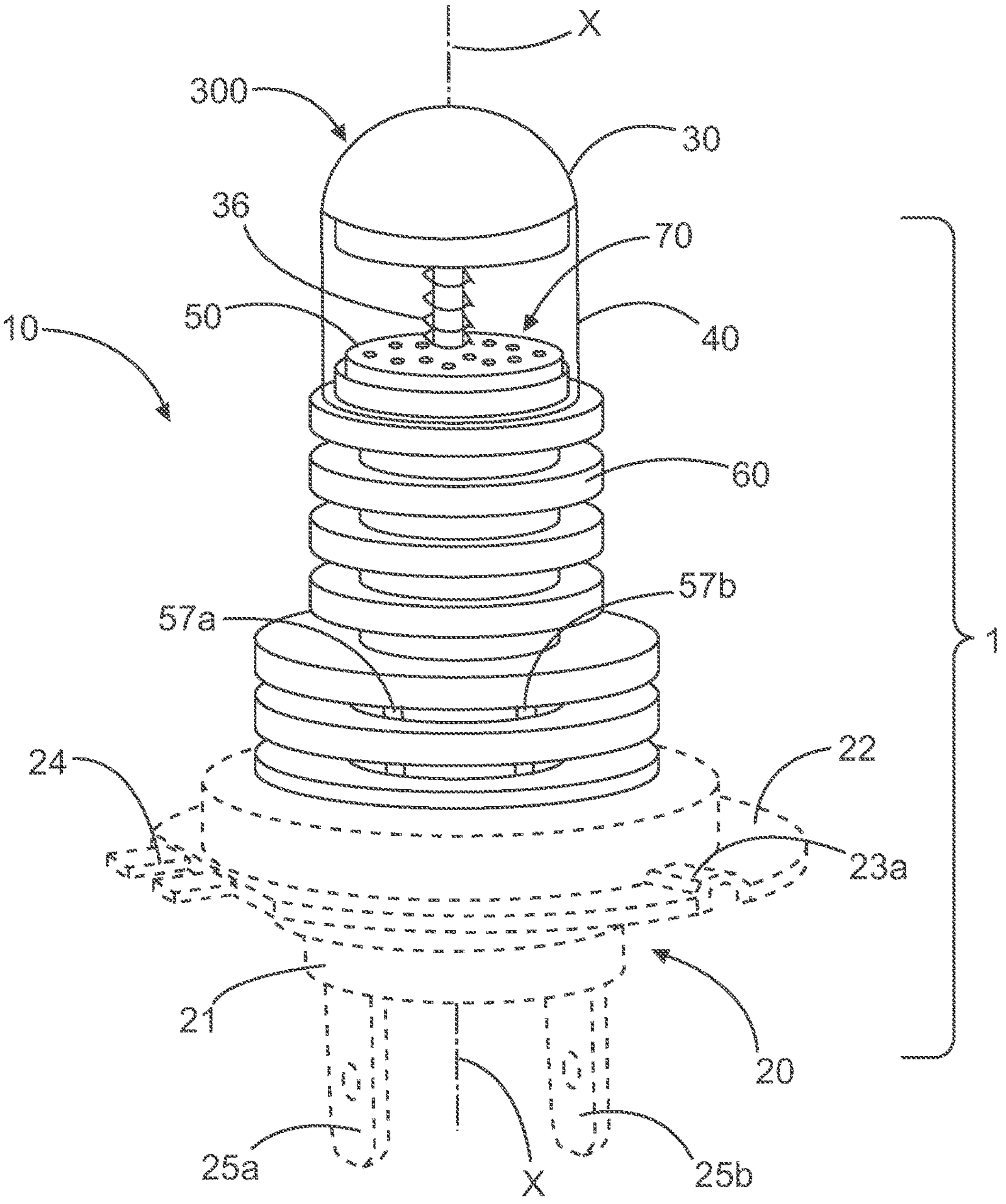
FIG. 1 shows a perspective view of an H7-type solid-state headlamp lamp according to an embodiment.

With reference to FIG. 1, the solid-state headlamp 10 is composed of a reflector optical system 300 (also referred to herein as reflector optics) having a reflector body 30 and a pin 360, a light-transmissive housing 40, a support member 50 formed as a circuit board having solid-state light sources 70 disposed thereon, a heat sink portion 60, and the base or mounting element 20. These components together form a lamp body 1 extending in a longitudinal direction or along a longitudinal axis X. This longitudinal axis X may correspond to the reference axis defined in the ECE regulation 37 mentioned at the outset and described below.

As can be seen in FIGS. 1 through 6, the solid-state headlamp 10 is formed of a generally rotationally symmetrical shape about the longitudinal axis X. The reflector optics including the reflector body 30 and the pin 360, and the light transmissive housing 40 form a front portion of the lamp body 1. The heat sink portion 60 and the socket 20 form a rear base portion of the lamp body 1. The support member 50 with the solid-state light sources 70 arranged thereon is arranged at a front end of the heat sink portion 60. The main surfaces of the support member 50 are perpendicular to the longitudinal axis X. Therefore, the solid-state light sources 70 arranged on the support member 50 emit their light into a space directed along the longitudinal axis X.

The distal end of the solid-state headlamp 10 is formed by the cap-shaped reflector optical system 300, which close off the light transmissive housing 40 in the distal direction. As will be explained in more detail below, the reflector optical system 300 serve to reflect the light emitted by the solid-state light sources 70 so that it emerges substantially in a plane perpendicular to the longitudinal axis X with maximum luminous intensity, but provides a sufficiently wide beam angle when viewed in any plane enclosing the longitudinal axis X. The radiation in all directions perpendicular to the longitudinal axis X is thereby quite homogeneous.

The light-transmissive housing 40 is also provided at the front end of the heat sink portion 60, so that the support member 50 with the solid-state light sources 70 arranged thereon is disposed within the light-transmissive housing 40. In addition to the solid-state light sources 70, a drive circuitry 55 electronically coupled to the light sources 70 and arranged with the support member 50 at the rear base portion of the lamp body 1, namely the front end of that portion, is also provided on the support member 50. The drive circuitry is adapted to drive the plurality of light sources 70 when supplied with power. The drive circuitry 55 is only indicated in FIG. 15 via the wiring of individual LED chips 72, but the basic structure of a drive circuitry 55 for arrays of solid-state light sources is generally known, so that reference can be made here to the relevant literature. If the support member 50 with the drive circuitry 55 and the solid-state light sources 70 arranged thereon is assigned to the front portion, then such front portion is essentially associated with a function of generating light from supplied power as well as optical reflection for emitting the light from the lamp.

The rear base portion, on the other hand, essentially has a function of dissipating the heat generated by the drive circuitry 55 and the solid-state light sources 70, as well as mechanically and electrically coupling the lamp 10 to the vehicle side via the socket 20. The components are described individually below.

II. Reflector Optics

Figure 8:
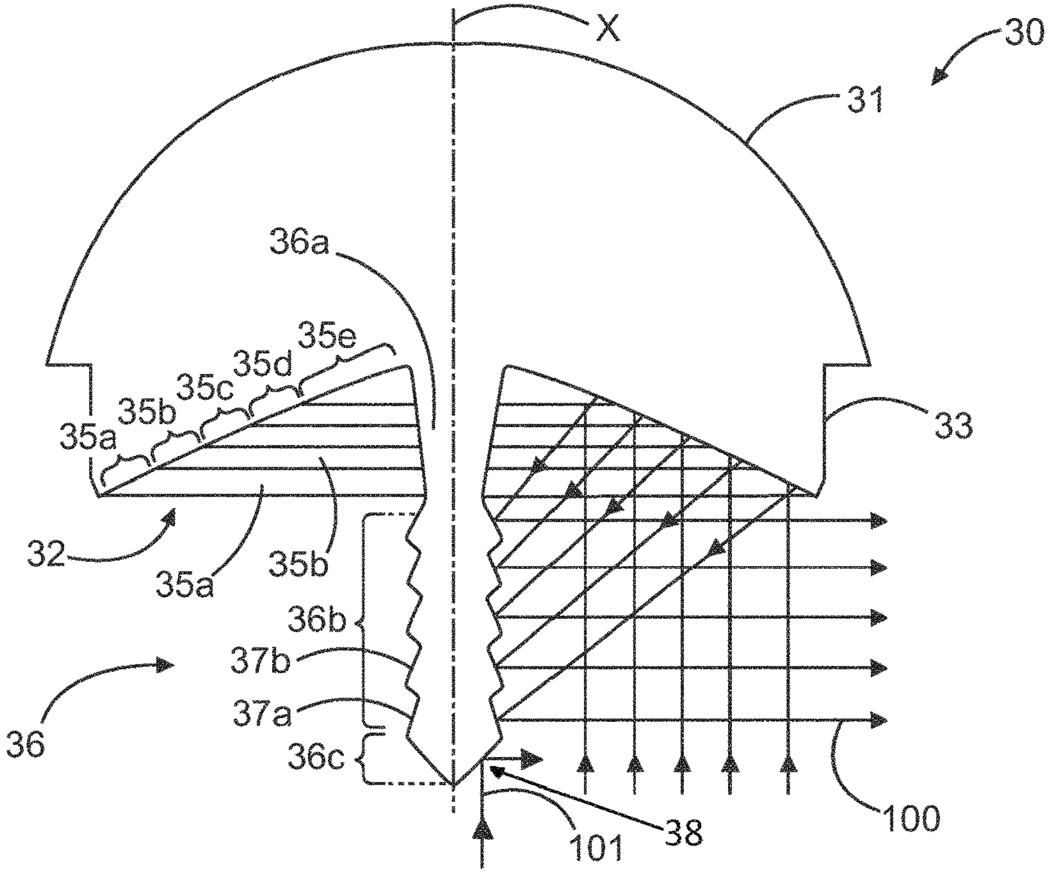
FIG. 8 shows a cross-sectional view of the reflector optics of FIG. 7 with the beam path of the light emitted by solid-state light sources indicated therein.

With reference to FIGS. 7 through 12, the structure and function of a reflector optical system 300 including reflector optics 39 that can be used in the solid-state headlamp 10 shown in FIGS. 1 through 6 is described. The system 300 includes the reflector body 30, which is rotationally symmetric about the longitudinal axis X and has a spherical outer surface 31 facing the distal direction. In the particular embodiment, it has a semi-spherical shape. On the side facing the proximal direction, i.e., facing the support member 50 and the solid-state light sources 70 in the assembled state, the reflector body 30 has a first reflector optic portion 32 having a substantially concave shape 320. The concave shape 320 is shaped in the manner of a concave mirror, but has an overall conical shape rather than a spherical segment shape or a paraboloid because, as can be seen in FIG. 8, no focal plane or singular focal point is intended.

Figure 10A:
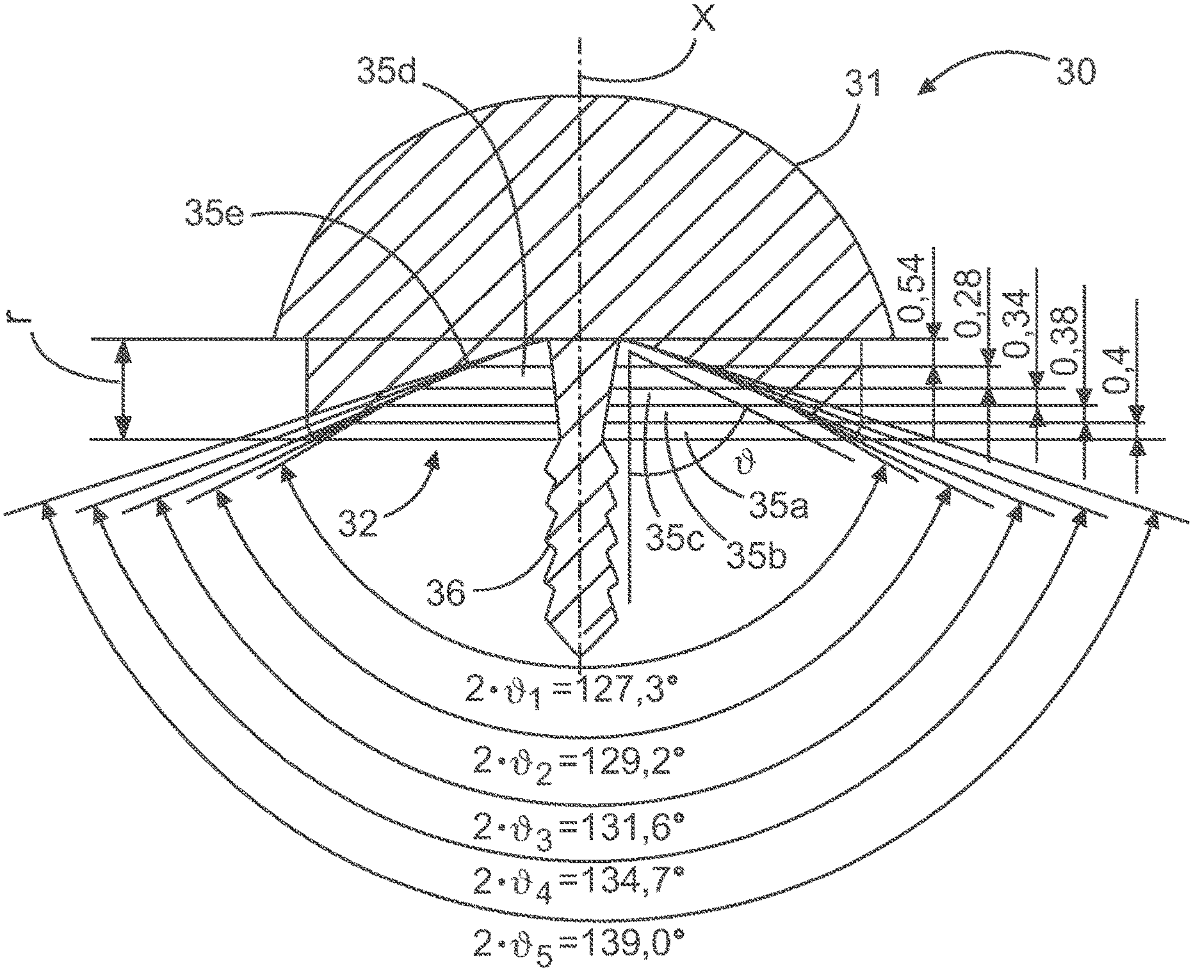
FIG. 10A shows a schematic cross-sectional view of the reflector optics of FIG. 7 showing the angles of inclination of first reflecting surfaces on the reflector body with respect to the longitudinal axis X.
Figure 10B:
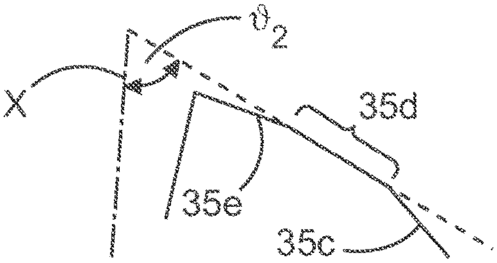
FIG. 10B shows a very schematic, enlarged, but not drawn to scale, section of FIG. 10A illustrating the angle of inclination as indicated therein.

Rather, the concave shape 320 of the first reflector optic portion 32 is composed of a plurality of first reflective surfaces 35*a*-35*e*, which are annularly arranged around the longitudinal axis X and concentric to each other. In the particular embodiment example, there are 5 first reflective surfaces 35*a*-35*e*, each of which is adjacent to the other. Furthermore, the first reflective surfaces 35*a*-35*e* each have a conical shape with a half cone angle or an inclination angle $\vartheta$ relative to the longitudinal axis X, which decreases with increasing distance from the longitudinal axis X. FIG. 10A shows, in one embodiment, how the inclination angle $\vartheta$ decreases from the innermost first reflective surface 35*e* at the smallest distance from the central or longitudinal axis X with $\vartheta_5$=69.5 deg. over the next adjacent first reflective surface 35*d* at a slightly larger distance from the central or longitudinal axis X with $\vartheta_4$=67.4 degrees, further over the next adjacent first reflecting surface 35*c* with again a slightly larger distance to the center or longitudinal axis X with $\vartheta_3$=65.8 degrees, further over the next first reflecting surface 35*b* with again a slightly larger distance to the center or longitudinal axis X with $\vartheta_2$=64.6 degrees, up until the outermost first reflecting surface 35*a* with the largest distance to the center or longitudinal axis X with an inclination angle of $\vartheta_1$=63.7 degrees. FIG. 10B schematically shows in an enlarged view how the angle $\vartheta$ is determined. Note that FIG. 10A graphically shows the full cone angle, i.e., $2\times\vartheta$.

The outer edge of the outermost first reflective surface 35*a* is bounded by a proximal end surface 33*a*. The inner edge of the innermost first reflective surface 35*d* is bounded by a conically shaped root portion 36*a* of a pin 360 to be explained below. The first reflective surfaces 35*a*-35*e* are provided with a highly reflective mirrored coating facing the light sources with a corresponding inclination. The reflectance amounts to 90% or more, preferably 95% or more. For example, in vacuum processes, the surface to be reflected can be coated with 99.98% pure aluminum or silver. The mirrored surface is sealed with a protective layer, for example silicone-based monomers (usually HMDS, VSI II or a combination).

In this way, the full irradiated surface of the concave shape 320 can be effectively used as the first reflective optic portion 32. It should be noted that the first reflective surfaces 35*a*-35*e* do not necessarily have to include a conical shape, they may also include a general skirt-shape, which also allows a concave or convex curved surface. According to further embodiments, a continuous skip-free surface may also be provided in the concave shape 320, in which the first reflective surfaces 35*a*-35*e* may smoothly merge into each other, accordingly.

Between the distal dome-shaped outer surface portion 31 of the reflector body 30 and the proximal end surface 33*a* there extends a substantially cylindrical flange portion 33 recessed from the dome-shaped outer surface portion 31 by a stepped portion 34. The flange portion 33 permits attachment of the light transmissive housing 40, into whose inner opening 43 at the distal end 41 the flange portion 33 can be fitted.

As can be seen in FIG. 8, which shows a beam of parallel light rays incident on the reflector optics along the longitudinal axis X and originating from the plurality of solid-state light sources 70, the annular first reflecting surfaces 35*a*-35*e* reflect the incident light by their inclination in the direction towards the longitudinal axis X, wherein—as mentioned above—the reflected beams do not meet in a common focal point on the longitudinal axis X, but arrive in mutually adjacent regions along the longitudinal axis X, so that the radiation density along the longitudinal axis X is distributed substantially homogeneously.

As can be seen from FIGS. 7 to 11, starting from the reflector body 30 in the center of the concave shape 320 or in the center of the annular first reflective surfaces 35*a*-35*e*, a pin 360 extends along the longitudinal axis X. The pin 360 is formed in a rotationally symmetrical shape. The pin 360 is rotationally symmetric and comprises substantially 3 sections. A first section is the aforementioned conical root portion 36*a*, which attaches directly to the center of the concave shape 320 on the reflector body 30. This conical root portion 36*a* tapers to an intersection of the pin 360 with a (virtual) plane perpendicular to the longitudinal axis X, defined by the proximal end face 33*a* at the edge of the concave shape 320. Beyond this intersection—as seen from the reflector body 30—a second reflector optic portion 36 extends along the longitudinal axis X, formed in principle by two immediately adjacent light emission regions 36*b*, 36*c* which contribute differently to the reflection. The first reflector optic portion 32 faces the second reflector optic portion 36 in at least a first (36*b*) of the two light emission regions. The pin 360, or more precisely the second reflector optic portion 36, represents the filament wire of conventional halogen headlight lamps that comply with the ECE standard Addendum 36: Regulation No. 37 (rev. 7) of Jul. 3, 2012, according to its function, position, length, and diameter, if applicable.

In this particular embodiment, the reflector body 30 and the pin 360 are monolithic, i.e. formed in one piece, e.g., made of an optical glass or a heat and/or UV resistant injection molded plastic material. The reflector body 30 may be opaque to prevent light leakage in the distal direction. It should be noted that the reflector body 30 and the pin 360 may as well be made of different materials not pertinent in the art. The tapered root portion 36*a* essentially has the function of holding the second reflector optic portion 36 centered on the longitudinal axis X while contributing as little as possible to shading. Other embodiments provide alternative supports for the second reflector optic portion 36, such as thin wires or a support extending from a side of the support member 50, but these may possibly always result in unwanted shading. Either way, however, the reflector optic portion 36 may be placed with great advantage on the longitudinal axis X extending from the reflector body 30 beyond the plane defined by its proximal end surface 33*a* (intersection point with longitudinal axis X), where the light reflected from the first reflective surfaces 35*a*-35*e* is incident in a relatively homogeneously distributed manner over this area.

The second reflector optic section 36 has a plurality of second reflective surfaces 37*a*-37*e* in spatial light receiving relationship with the plurality of first reflective surfaces 35*a*-35*e*. This means that the first reflective surfaces face the second reflective surfaces 37*a*-37*e* and vice versa, the function here being that, as can be seen in FIG. 8, the light supplied along the longitudinal axis X of the reflector optics 39 is reflected twice and, at the end, reflected or emitted substantially perpendicularly to the longitudinal axis X by the second reflective surfaces 37*a*-37*e*, in the case of the light transmissive housing 40 being attached, through the latter.

The second reflector optic section 36, including the second reflective surfaces 37*a*-37*e*, is set up rotationally symmetrical about the longitudinal axis X. The second reflective surfaces 37*a*-37*e* are formed annularly about the longitudinal axis X and have a conical shape or the skirt-like shape mentioned above. Each of the second reflective surfaces 37*a*-37*e* has the shape of a truncated cone, and the second reflective surfaces 37*a*-37*e* are arranged along the second reflector optic section 36 in a sequential manner on the pin 360.

The second reflective surfaces 37*a*-37*e* each taper toward the first reflector optic portion 32 and are aligned along the longitudinal axis X. To compensate for the increase in diameter along the longitudinal axis X caused by the taper of each of the second reflective surfaces 37*a*-37*e*, a step or undercut 39*b*-39*e* is provided between each of two adjacent second reflective surfaces 37*a*-37*e*, which in itself does not contribute to the reflection of radiation originating from the first reflector optic portion 32, but according to an alternative embodiment can be used for direct reflection of light incident from the light sources 70 not directly parallel to the longitudinal axis X but rather obliquely. At least, the scattered light from these undercuts can be used for radiation of the lamp outside the horizontal plane, i.e. for beam expansion.

Figure 11A:
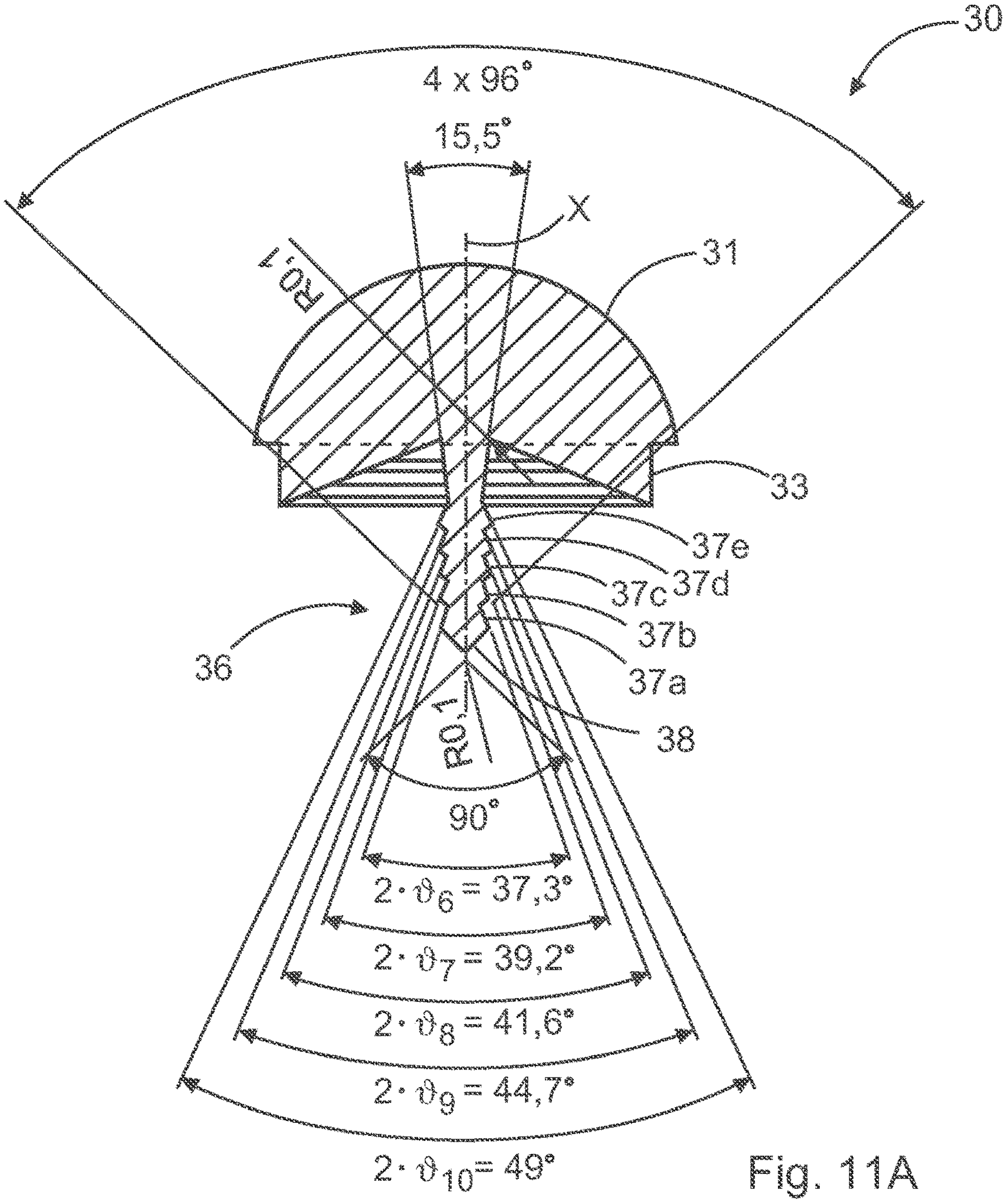
FIG. 11A shows a schematic cross-sectional view of the reflector optics of FIG. 7 showing the angles of inclination of second reflective surfaces on the pin with respect to the longitudinal axis X.
Figure 11B:
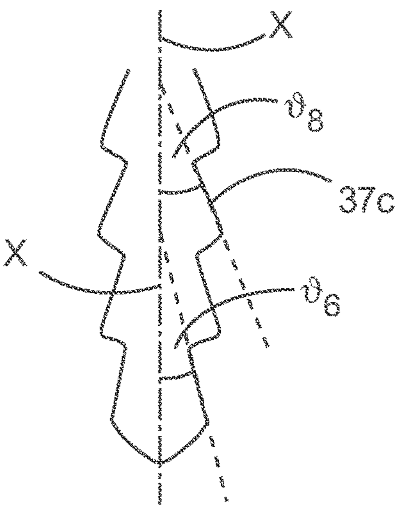
FIG. 11B shows a very schematic, enlarged, but not drawn to scale, section of FIG. 11A illustrating the angle of inclination indicated therein.

As shown in FIG. 11A, the second reflective surfaces 37a-37e also each include an inclination angle $\vartheta$ with the longitudinal axis X. In this regard, in a particular embodiment, FIG. 11A shows how the inclination angle $\vartheta$ decreases from the second reflective surface 37e closest to the first reflector optic portion with $\vartheta_{10}$=24.5 degrees, through the next second reflective surface 37d with $\vartheta_9$=22.4 degrees, further through the next first reflective surface 37c with $\vartheta_8$=20.8 degrees, further through the next first reflective surface 37b with $\vartheta_7$=19.6 degrees, to the outermost first reflective surface 37a with $\vartheta_6$=18.7 degrees. FIG. 11B shows schematically in an enlarged view how the angle $\vartheta$ is determined. Note that FIG. 11A also graphically shows the full cone angle, i.e., $2\times\vartheta$.

Similar to the first reflective surfaces 35a-35e, the inclination angle of the second reflective surfaces 37a-37e decreases with increasing distance from the first reflector optic portion 32 along the longitudinal axis X. As can be seen in FIG. 8, a direct spaced light-receiving relation also exists between individual pairs of first and second reflective surfaces. The corresponding numbers of first reflective surfaces 35a-35e and second reflective surfaces 37a-37e are the same.

Thus for example, the innermost first reflective surface 35e is associated with the most distally positioned second surface 37e. The difference in inclination angles $\vartheta_5$ and $\vartheta_{10}$ amounts to 45 degrees—the same as required for double reflection with subsequent horizontal radiation from the light transmissive housing 40. Similarly, the next-innermost first reflective surface 35d is associated with the next-distal second reflective surface 37d (see FIG. 8). Again, the difference in inclination angles $\vartheta_4$ and $\vartheta_9$ is exactly 45 degrees. Consequently, this setup enables optimum radiation of the light from the solid-state headlamp 1 in the horizontal direction (see 90 degrees or −90 degrees in FIG. 13).

Conceivably, according to an alternative embodiment example, the inclination angles $\vartheta_1$ to $\vartheta_6$ or $\vartheta_6$ to $\vartheta_{10}$ could also simply be kept constant among each other, so that the difference of 45 degrees is maintained here as well.

However, at least in the case of the first reflective surfaces, the variation in the angle of inclination has the advantage that the spatial distance between the outermost first reflective surface 35a and the most proximal second reflective surface 37a does not become too large, so that sufficiently intense reflection is also ensured towards the front end of the pin 360, which therefore emits light as homogeneously as possible along the length of the second reflector optic section 36.

Figure 12:
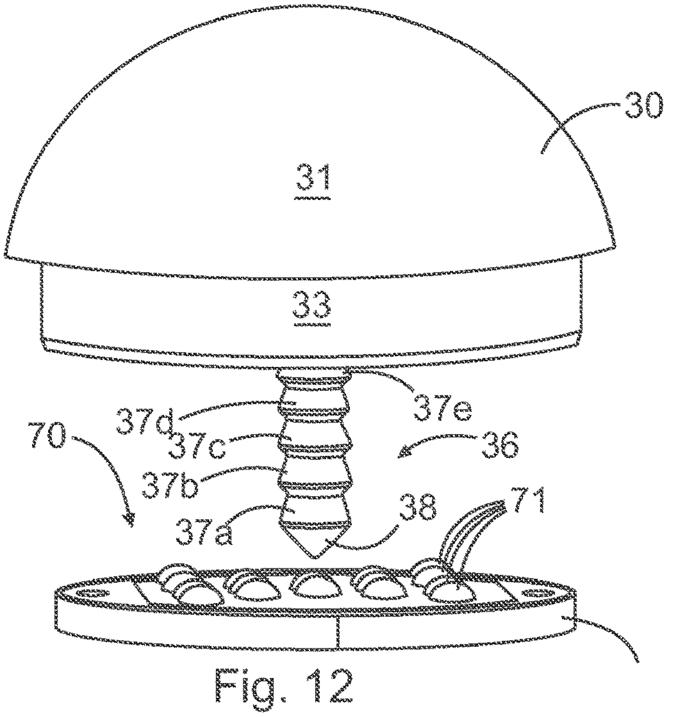
FIG. 12 shows a perspective view of the combination of reflector optics and support member (printed circuit board) with solid-state light sources arranged thereon.
Figure 15:
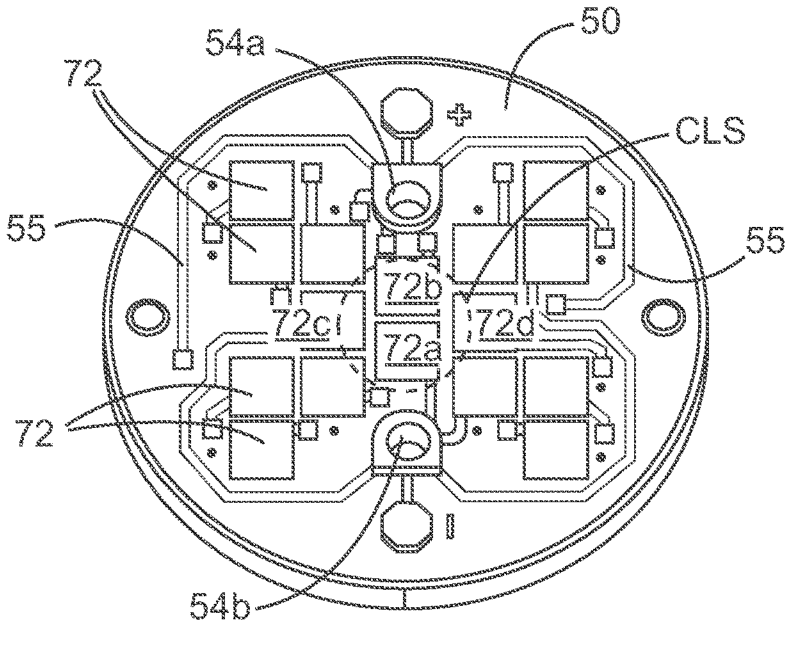
FIG. 15 shows in oblique plan view the support member (printed circuit board) with a special arrangement of the solid-state light sources arranged thereon.

The pin 360 also has a free end 38a (a tip) that faces the support element 50 or the solid-state light sources 70 when the reflective optical system 300 is installed in the lamp. Adjacent to the free end 38a, a third reflective surface 38 is provided. It has the shape of a cone whose orientation is inverted compared to that of the plurality of second reflective surfaces 37a-37e, i.e., it tapers towards the tip or free end 38a. Here, the angle of inclination with respect to the longitudinal axis X is 45 degrees. In FIG. 12, it can be seen that the third reflective surface 38 is directly opposite a central region CLS of the support element 50, in which—as can be seen in FIG. 15—a subset of four LED chips 72a-72d d is arranged. The third reflective surface 38 reflects the emitted light thereof directly and immediately in the horizontal direction through the light transmissive housing 40 in a 360-degree circle without shading, but also with sufficient radiation angles in the plane including the longitudinal axis X.

Figure 9:
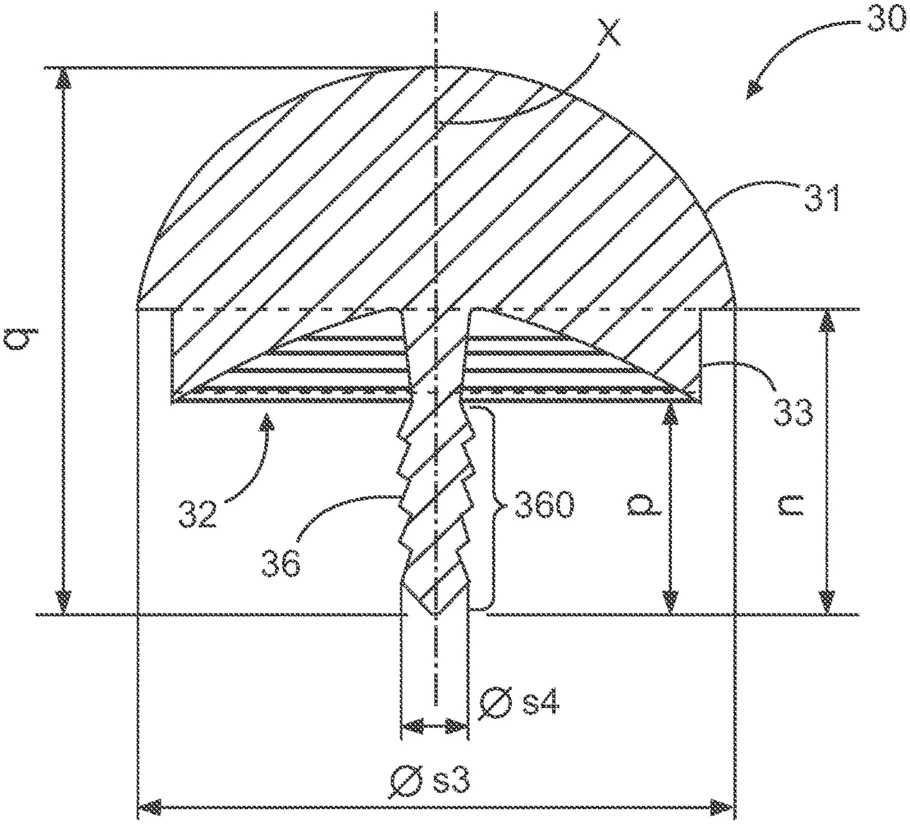
FIG. 9 shows a cross-sectional view of the reflector optics from FIG. 7 showing the lengths and diameters of individual sections of the reflector optics.

In FIG. 9, dimensions of the reflector optical system 300 are illustrated. The diameter s3 of the system 300 or the reflector body is, for example, 13 mm or 13.5 mm, and its length q including the pin 360 amounts to 11.5 mm. The diameter s3 should preferably be no more than 15 mm, thus complying with ECE regulation 37 for H7 and H11 types. The length p of the second reflector optical section 36 amounts to 4.5 mm in the embodiment and should preferably be between about 4.0 mm and about 5.9 mm, and the total length of the pin including the root portion 36a amounts to 6.5 mm in the example here. The maximum diameter 54 of the pin 360 or the second reflector optic portion 36 is 1.5 mm in the embodiment, but it should in any case preferably have a nominal diameter 54 of not more than 5 mm, further preferably of not more than 2.5 mm.

III. Photometric Properties of the Solid-State Headlamp

The solid-state headlamp 10 may be suitable as a retrofit lamp for the headlight applications described above. In other words, it can replace H7, H8, H9, H11 or H16 type halogen lamps in vehicle front headlights, with the corresponding types of sockets 20 to be set up in FIGS. 1 to 6.

Figure 2:
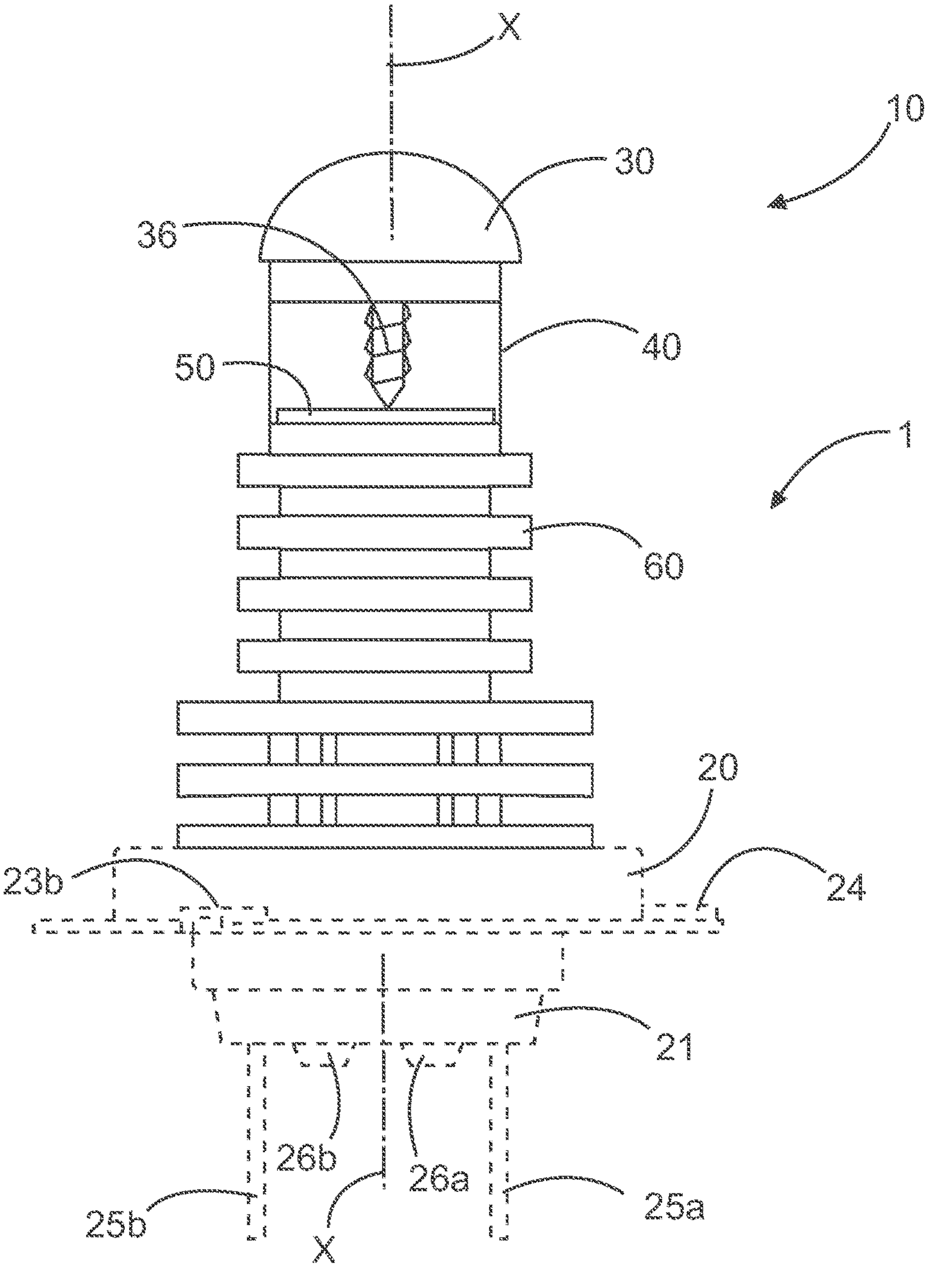
FIG. 2 shows a side view of the solid-state headlamp lamp of FIG. 1.
Figure 3:
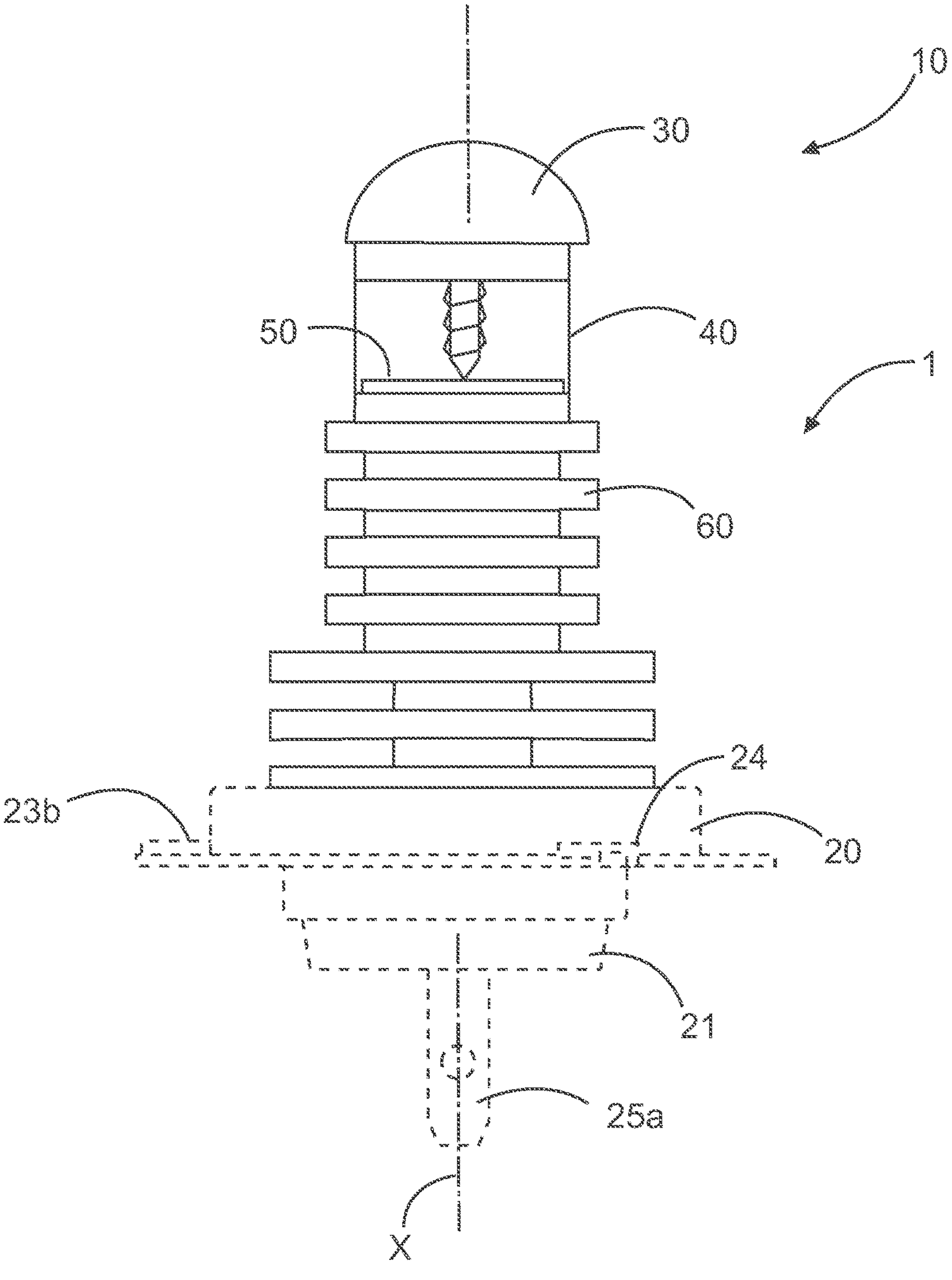
FIG. 3 shows a side view of the solid-state headlamp lamp of FIG. 1 rotated by 90 degrees about its longitudinal axis compared to the view in FIG. 2.

In particular, the drive circuitry 55 and the solid-state light sources 70, together with the reflector optics 39, are designed so that, when powered, they cause the solid-state headlamp 10 to emit through the light-transmissive housing 40:

(a) a luminous flux of at least 1500 lumens+/−10% when supplied with a test voltage of 13.2 volts, or of at least 1750 lumens+/−10% when supplied with a test voltage of 28 volts, the lamp 10 not spatially extending in its external dimensions beyond an envelope as shown in FIG. 2 on page 35 of Annex 36: ECE Regulation 37 (dated 3 Jul. 2012) for a lamp of the H7 type; or (b) a luminous flux of at least 800 lumens+/−15% when supplied with a test voltage of 13.2 volts, the lamp 10 not spatially extending in its external dimensions beyond an envelope as shown in FIG. 2 on page 39 of Annex 36: ECE Regulation 37 (of 3 Jul. 2012) for an H8 type lamp; or (c) a luminous flux of at least 2100 lumens+/−10% when supplied with a test voltage of 13.2 volts, the lamp 10 not spatially extending in its external dimensions beyond an envelope as shown in FIG. 2 on page 43 of Annex 36: ECE Regulation 37 (of 3 Jul. 2012) for a lamp of the H9 type; or (d) a luminous flux of at least 1350 lumens+/−10% when supplied with a test voltage of 13.2 volts or at least 1600 lumens+/−10% when supplied with a test voltage of 28 volts, the lamp 10 not spatially extending in its external dimensions beyond an envelope as shown in FIG. 2 on page 50 of Annex 36: ECE Regulation 37 (dated 3 Jul. 2012) for a lamp of the H11 type; or (e) a luminous flux of at least 500 lumens+10%/−15% when supplied with a test voltage of 13.2 volts, the lamp 10 not spatially extending in its external dimensions beyond an envelope as shown in FIG. 2 on page 70 of Annex 36: ECE Regulation 37 (dated 3 Jul. 2012) for a lamp of the H16 type.

The special requirements are that in the narrow space of the lamp 10 defined by the envelope, a comparatively high power consumption takes place and the light is emitted by suitable reflector optics 39 with as little loss as possible, i.e., without absorption within the lamp, while the generated heat is efficiently dissipated without any impairment of the electrical components or the material.

A particular effect is achieved in that the second and third reflective surfaces 37a-37e, 38 on the pin 360 and in particular the light emitting regions 36*b*, 36*c* are defined according to their position with respect to a reference plane defined by the corresponding socket 20 (this applies to all types (a) to (e) as indicated above) and the longitudinal or reference axis is defined in a predetermined virtual box shown in Annex 36: ECE Regulation 37 (dated 3 Jul. 2012) on page 38 for the H7 type, on page 42 for the H8 type, on page 46 for the H9 type, on page 53 for the H11 type and on page 73 for the H16 type and supplemented with tolerance values in tables. The dimensions shown with reference to FIG. 9 (see description in section above) meet such box tolerances very well. It is important that the lamps according to the embodiments (for the indicated lamp types H7, H8, H9, H11, H16) comply with the distance of the tip of the second reflector optic portion 36 from the respective defined reference plane (RP) of 25 mm. The tolerance values bi of 0.25 mm are also complied with (or 0.2 mm for H7 and H11 at 12 volts nominal voltage). In the case of the H7 lamp, for example, the reference plane RP is defined by the distally oriented end face of the radial mounting lugs 23*a*, 23*b* and 24. The specifications regarding the reference plane for the respective lamp type (H7, H8, H9, H11 or H16) can be found in the respective FIG. 1 in Annex 36: ECE Regulation No. 37 (rev. 7) of Jul. 3, 2012 (correspondingly on pages 35, 39, 43, 50, and 70, respectively).

The length of the second reflector optic portion 36 can also be set in each case within the tolerance limits (values c1 (maximum length) and c2 (minimum length) in the tables: H7 12V: c1=4.6 mm, c2=4.0 mm; H7 24V: c1=5.9 mm, c2=4.4 mm; H8: c1=4.6 mm, c2=3.5 mm; H9: c1=5.7 mm, c2=4.6 mm; H11 12V: C1=5.0 mm, c2=4.0 mm; H11 24 V: c1=6.3 mm, c2=4.6 mm; H16: c1=3.6 mm, c2=2.6 mm). For the H7 12V type shown here purely as an example, the corresponding length p in FIG. 9 is 4.5 mm.

As a result, according to embodiments, the structure of the reflector optics in particular and the lamp body in general achieve a lamp structure that complies with ECE standards.

Figure 13:
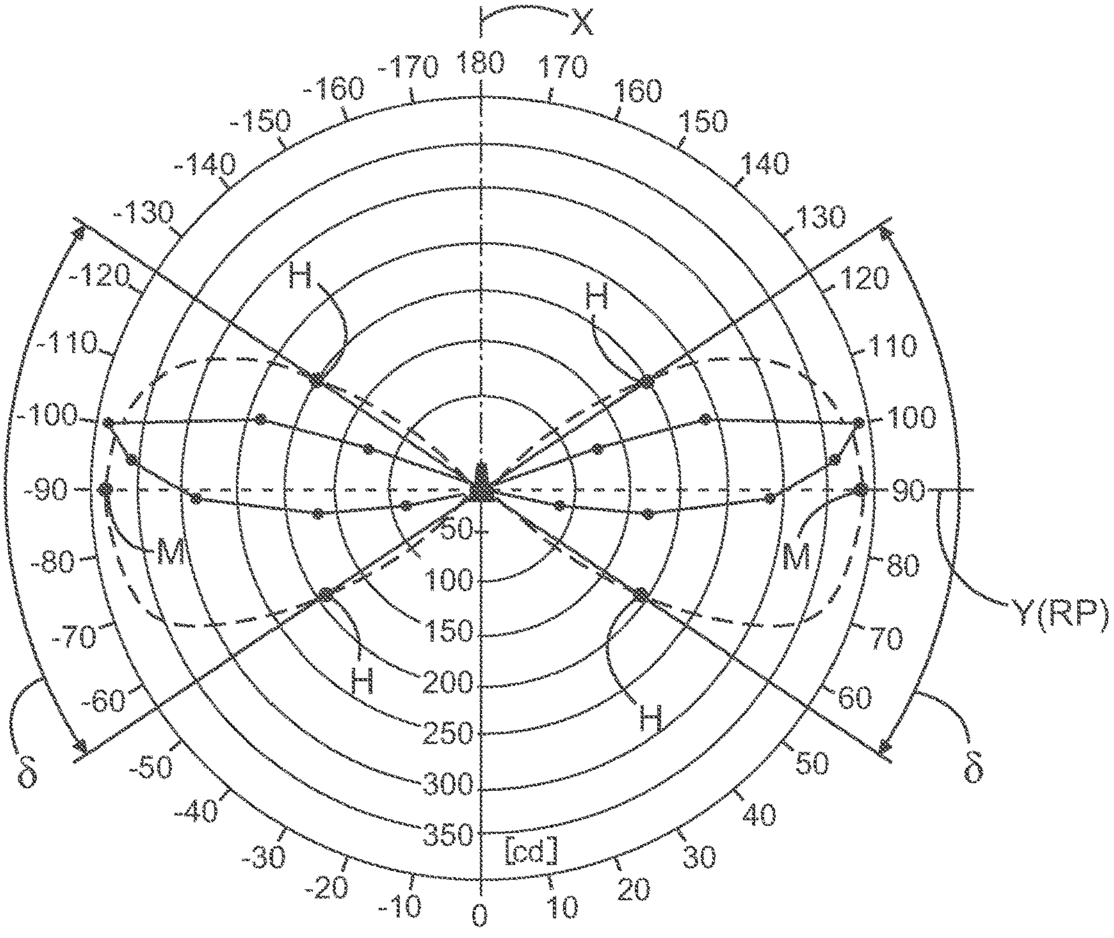
FIG. 13 shows a diagram showing the radiation characteristics of the solid-state headlamp from FIG. 1.

FIG. 13 shows the radiation pattern of a solid-state headlamp 10 of an embodiment. The plane of the drawing includes the longitudinal axis X and any axis Y perpendicular thereto, which lies in or parallel to the reference plane RP. The lamp 10 is schematically drawn in the center. The drawing plane of FIG. 13 is the same as that of FIG. 4. At 180 degrees, the distal direction is positioned (in FIG. 4, the upward direction), i.e., in principle, the front direction of the vehicle when the lamp is installed in its headlight reflector 200.

Figure 14:
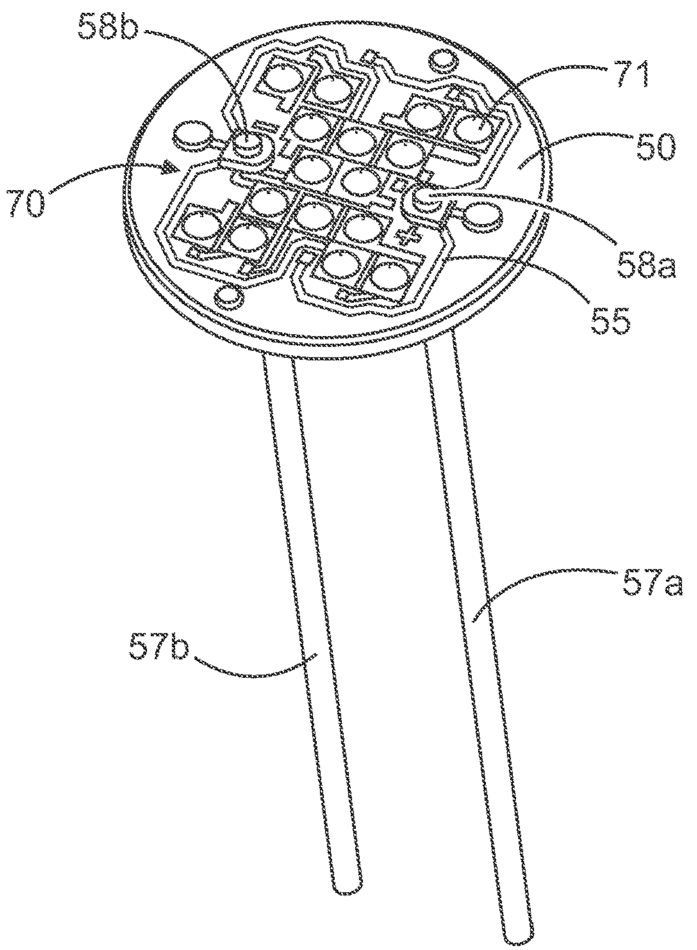
FIG. 14 shows in a perspective view the support element of FIG. 12 with solid-state light sources arranged thereon as well as the corresponding current supply lines.

The rings around the center point indicate the luminous intensity in the respective direction. The narrow polygonal trace with solid lines shows the result of a simulation for the solid-state headlamp 10 embodied according to the embodiment in FIGS. 1 to 6, using the reflector optics 39 of FIGS. 7 to 12 and a support member 50 with an array of solid-state light sources 70 as shown in FIGS. 14 and 15. As can be seen in FIG. 13, the radiation angle in the substantially horizontal direction (90 degrees) is approximately 10 degrees. Here, the radiation angle (γ) is calculated based on the light emitted at a luminous intensity that is at least half of the maximum luminous intensity in the plane. This is illustrated by the example of the radiation pattern drawn by dashed lines: the point M denotes the maximum luminous intensity, the points H that angle at which the luminous intensity is only half of the maximum value. The radiation angle (γ) is schematically drawn, it amounts to 65 to 70 degrees.

By adapting the first and second reflective surfaces, adapting the optical lenses 71 in the solid-state light sources 70, or the coating or materials used, combined also with a further use of scattered light, an extension of the radiation angle (γ) to at least 40 degrees, at least 50 degrees or even at least 60 degrees is readily achievable for the skilled person, which is indicated in FIG. 13 by the dashed radiation characteristic. This may in particular be achieved, different from the embodiment shown in FIG. 10A, by again decreasing the inclination angle $\vartheta_1$ to $\vartheta_5$ of the first reflective surfaces (35*a*-35*e*) with increasing distance from the longitudinal axis X (in order to reflect the light further forward onto the pin 360 through the concave mirror arrangement), but then assigning inclination angles $\vartheta_6$ to $\vartheta_{10}$ to the second reflective surfaces, which also increase with increasing distance from the first reflector optic portion 32. With reference to FIG. 13, then, for example, light from second reflective surfaces (e.g., 37*a*, 37*b*) having comparatively larger inclination angles near the tip of the pin will also be reflected into angular ranges up to about 120 or 130 degrees (see FIG. 13). Conversely, second reflective surfaces (e.g., 37*d*, 37*e*) with comparatively smaller inclination angle near the first reflector optic portion 32 or near the root portion 36*a* of the pin 36 may then reflect light to an angular range up to 50 or 60 degrees (see FIG. 13).

This would also be possible the other way around, but the outer edges of the cap-shaped reflector optics 39 or the support member 50 would then shade large angles above/below the horizontal plane (90 degrees in FIG. 13). In any case, this approach may also be suitable for successful beam widening up to 60 or even 70 degrees (angle (γ)).

In other words, while the inclination angles of the first reflective surfaces (35*a*-35*e*) according to embodiments preferably decrease with increasing distance from the longitudinal axis X in order to obtain an optimal (maximum) radiation in the horizontal direction (and thus the lowest possible light losses in lamp), the course of the inclination angles of the second reflective surfaces (37*a*-37*e*) can be selected as a function of the distance from the first reflector optic portion 32 depending on a desired beam expansion, and accordingly increase, be constant, or decrease.

It should also be noted that, with advantage, the radiation characteristic of the light emitted by the light transmissive housing 40, is approximately rotationally symmetrical about the longitudinal axis (X), i.e., substantially free of shading effects.

The support member 50 shown in FIGS. 14 and 15 may preferably be a printed circuit board with high thermal conductivity, preferably with a base material having a thermal conductivity of not less than 7 W/(m·K). It has, for example, a thickness of 1 mm. A rectangular array of LED chips 72 is placed on the support member 50, wherein in the specific embodiment 16 blue LED chips 72 (wavelength: 455 nm) are serially connected in 4 parallel strings (of 4 LED chips each). A phosphor-ceramic converter is bonded to the LED chips 72, which converts the blue light into ECE-compliant white light with a correlated color temperature (CCT) of 5000 to 6000 K. The light is then emitted by the LED chips 72. It should be noted here that the type of PCB, as well as the number and interconnection of the LED chips 72 may be arbitrary, as long as the luminous flux provided by them is maintained. Consequently, more or fewer LEDs may be provided, or LEDs with other correlated color temperatures, as well as mixtures of LEDs of different types, which, for example, may be combined to produce a white field.

However, it has been found to be particularly advantageous if silicone collimator lenses 71 are individually injection molded onto each of the LED chips 72 to reduce the beam angle of the LED chips 72 from typically 60 degrees to 10-20 degrees, i.e., to bring about some focusing of the light emitted from the solid-state light sources 70 toward the reflector optics 39 so that the light impinges substantially parallel to the longitudinal axis X onto the first reflector optics section 32.

By such a structure, a luminous efficiency of the light emitted through the light-transmissive housing 40 calculated on the consumption per electrical power supplied to the drive circuitry 55 may be at least 100 lumens per watt, preferably 120 lumens per watt, more preferably 150 lumens per watt, in the case of the solid-state headlamp 10.

Figure 16:
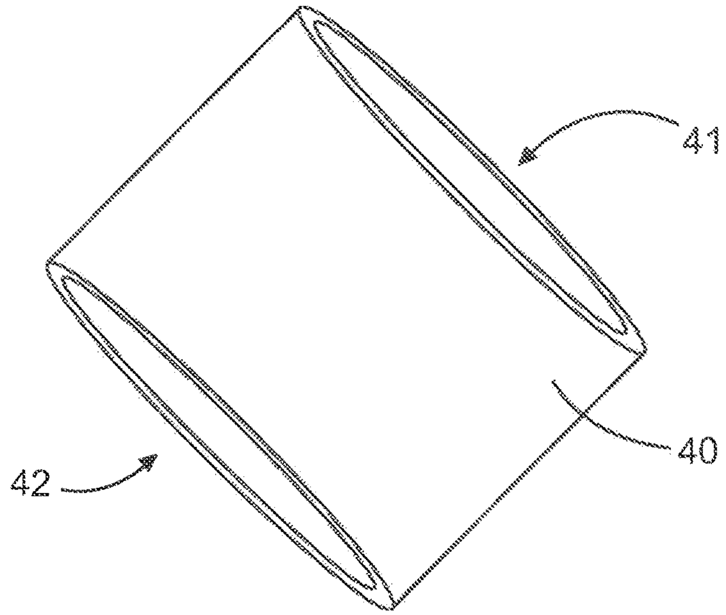
FIG. 16 shows in a perspective view, a light transmissive housing of the solid state headlamp of FIG. 1.
Figure 16:
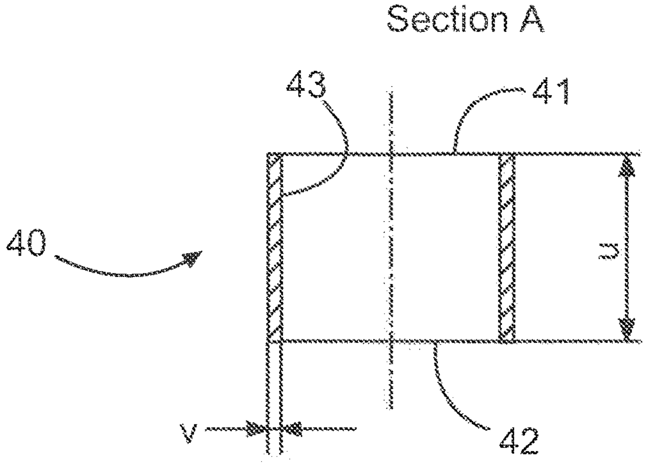
Figure 17:
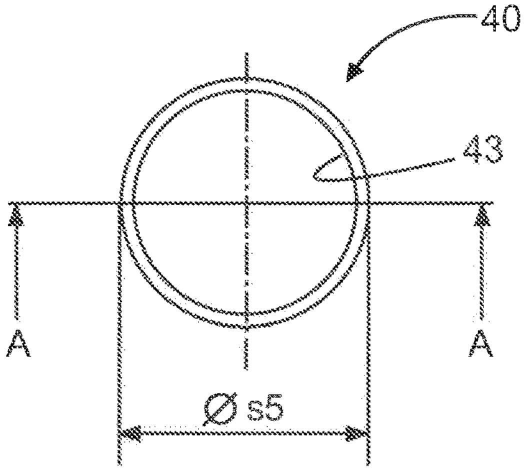
FIG. 17 shows a cross-sectional view (top) and a top view (bottom) of the light transmissive housing of FIG. 16 with dimensions.
Figure 18:
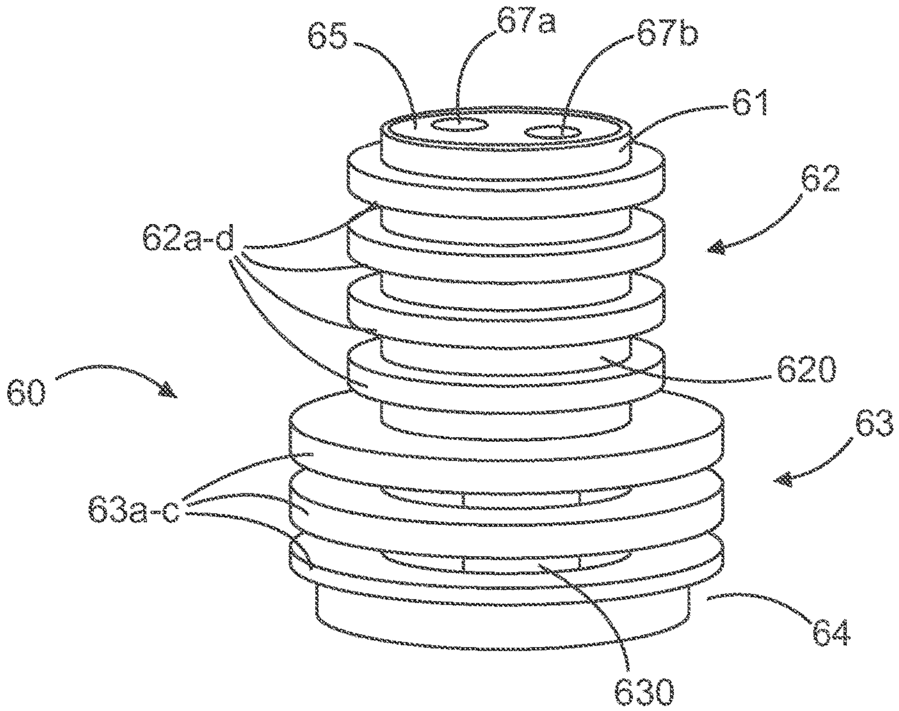
FIG. 18 shows a perspective view of a heat sink section of the solid state headlamp of FIG. 1.
Figure 19:
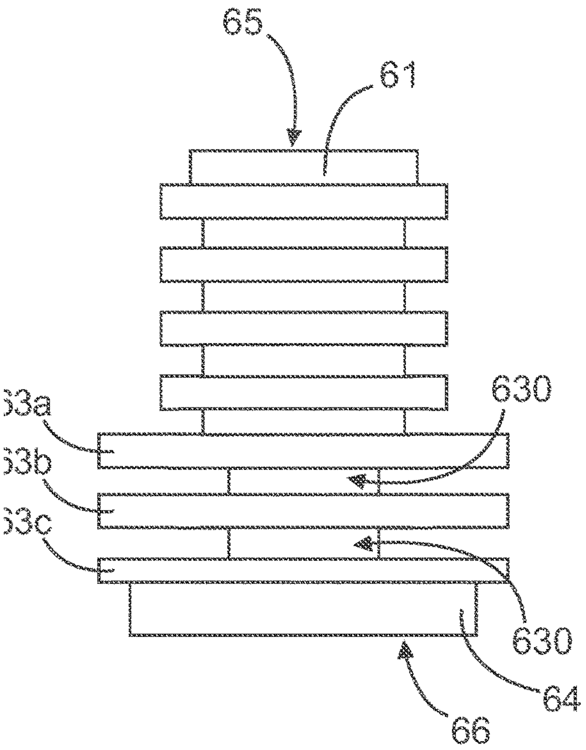
FIG. 19 shows a side view of the heat sink portion of FIG. 18.
Figure 20:
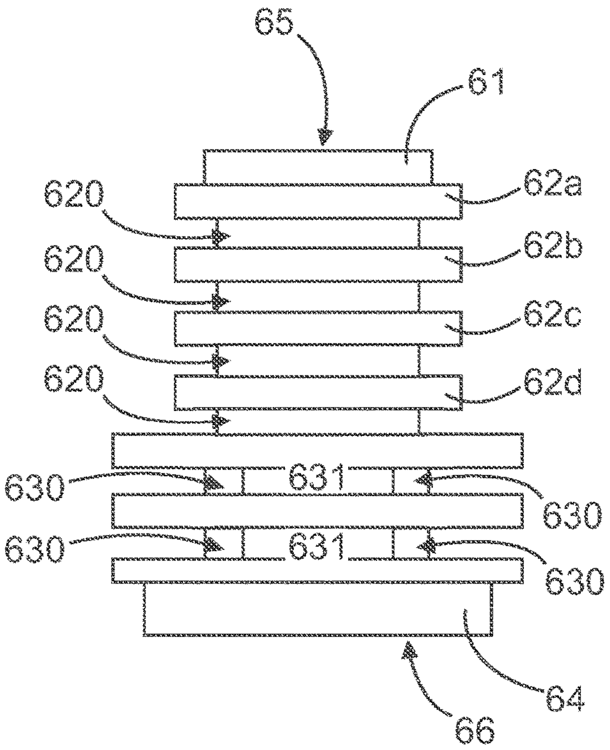
FIG. 20 shows a side view of the heat sink portion of FIG. 18 rotated by 90 degrees about its longitudinal axis compared to the view shown in FIG. 19.
Figure 21:
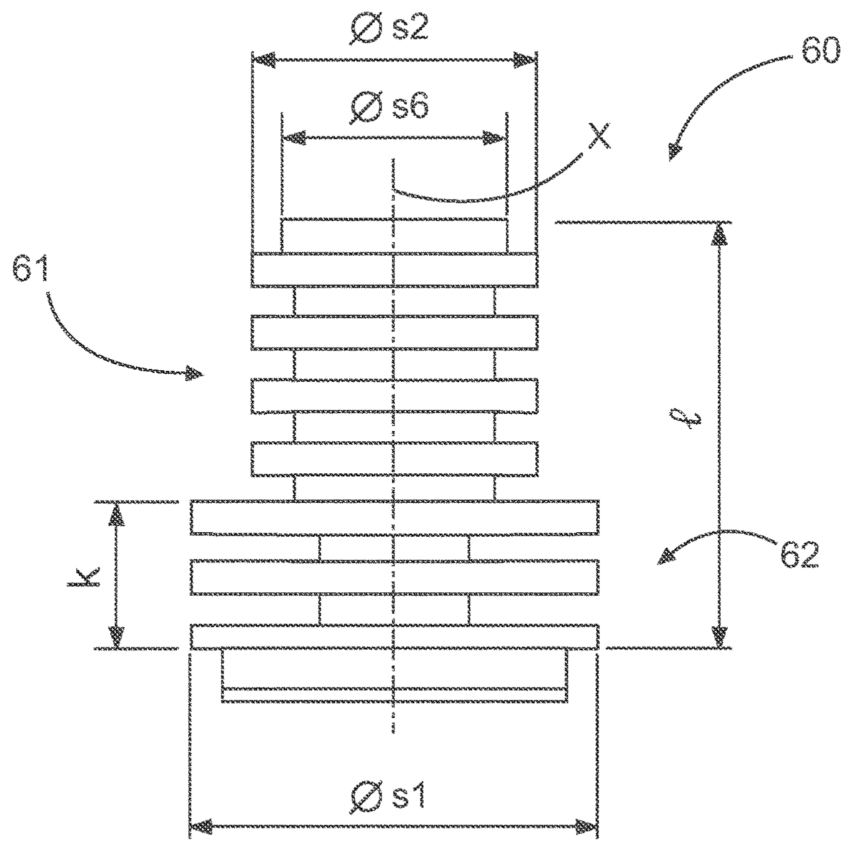
FIG. 21 shows a side view of the heat sink portion of FIG. 18 similar to FIG. 19, but showing lengths and diameters of individual sections of the portion.

The light transmissive housing 40 is shown in FIGS. 16 and 17. In the particular embodiment, it is a cylindrical envelope made of hard glass, which essentially serves as a dirt and dust shield for the inner chip and mirror space. In the particular embodiment, it has a length u of 9.5 mm and a wall thickness v of 0.6 mm, and a diameter S5 of 13 mm. The glass is preferably a UV-attenuating glass, or a UV-attenuating hard glass, in particular an aluminum silicate glass. A non-limiting example of an easy-to-use hard glass is Schott 8253.

In particular, the light-transmissive housing 40 may preferably comprise a UV-attenuating material having a UV transmittance of no more than 90% per 1 mm at a wavelength of 380 nm, of no more than 50% per 1 mm at a wavelength of 315 nm, and of no more than 5% per 1 mm at a wavelength of 250 nm. Schott 8253 satisfies such conditions. The second reflector optic portion 32 is in register with the light transmissive housing 40. It is positioned within the light transmissive housing 40 and the second reflective surfaces 37*a*-37*e* each face the light transmissive housing 40, albeit at an angle.

By using the blue LEDs with converter and the UV-attenuating hard glass, compliance with the following conditions specified in ECE Regulation 37 can be ensured according to embodiments:

For a factor k1 substantially expressing a relative amount of UV-A radiation power with respect to a luminous flux of visible light emitted through the light-transmissive housing 40 defined as $$k1 = \frac{\int_{\lambda=315\,nm}^{\lambda=400\,nm} Ee(\lambda)\cdot d\lambda}{k_m \cdot \int_{\lambda=380\,nm}^{\lambda=780\,nm} Ee(\lambda)\cdot V(\lambda)\cdot d\lambda},$$

a condition: $k1 \leq 2\cdot 10^{-4}$ WPM is satisfied, wherein:

Ee (λ) as measured in W/nm is the spectral distribution of the radiant flux;

V (λ) is the dimensionless spectral luminous efficiency;

$k_m$ provided as 683 lm/W is the photometric radiation equivalent; and

λ as measured in nm is the wavelength, wherein value k1 is calculated using intervals of the wavelength λ of five nanometers.

Preferably, the factor $k1 \leq 2\cdot 10^{-5}$ W/lm.

For a factor k2 substantially expressing a relative amount of UV-B radiation power with respect to a luminous flux of visible light emitted through the light-transmissive housing 40 defined as $$k2 = \frac{\int_{\lambda=250\,nm}^{\lambda=315\,nm} Ee(\lambda)\cdot d\lambda}{k_m \cdot \int_{\lambda=380\,nm}^{\lambda=780\,nm} Ee(\lambda)\cdot V(\lambda)\cdot d\lambda},$$

a condition: $k2 \leq 2\cdot 10^{-6}$ WPM is satisfied, wherein:

Ee (λ) as measured in W/nm is the spectral distribution of the radiant flux;

V (λ) is the dimensionless spectral luminous efficiency;

$k_m$ provided as 683 lm/W is the photometric radiation equivalent; and

λ as measured in nm is the wavelength, wherein value k2 is calculated using intervals of the wavelength λ of five nanometers.

Preferably, the factor $k2 \leq 2\cdot 10^{-7}$ W/lm. This ensures that the plastic components of the headlight reflector etc. surrounding the lamp 10 are not detrimentally affected by the UV radiation.

IV. Heat Sink Portion

FIGS. 18 to 23 show the heat sink portion 60 in detail. It substantially concerns a cooling body made of a material with high thermal conductivity of preferably 200 W/(m·K) or more, for example aluminum, or further preferably 300 W/(m·K), for example copper with e.g. 340 W/(m·K) or a copper alloy.

The heat sink portion 60 comprises a distal base portion 62 and a proximal base portion 63, which differ in diameter but otherwise both have substantially the same cylindrical structure, each characterized by a number of annular, circumferential and mutually parallel cooling ribs 62*a*-62*d* and 63*a*-63*c*, respectively. The diameter s1 of the proximal base portion 63 with the cooling ribs 63*a*-63*c* is 19.8 mm and the diameter s2 of the distal base section 62 with the cooling ribs 63*a*-63*c* is 14.5 mm.

Figure 4:
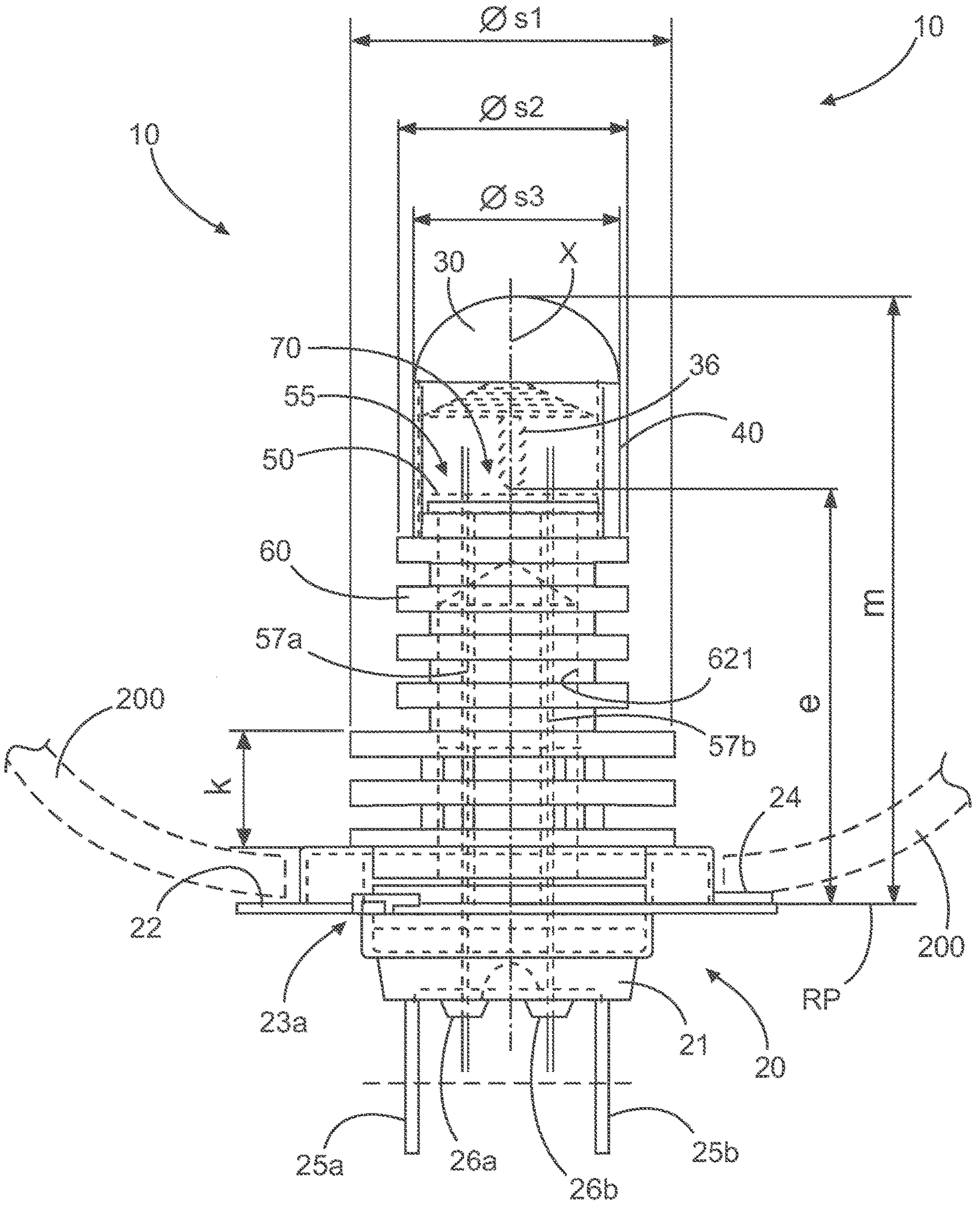
FIG. 4 shows a side view of the solid-state headlamp similar to FIG. 2, but showing lengths and diameters of individual sections of the lamp.
Figure 5:
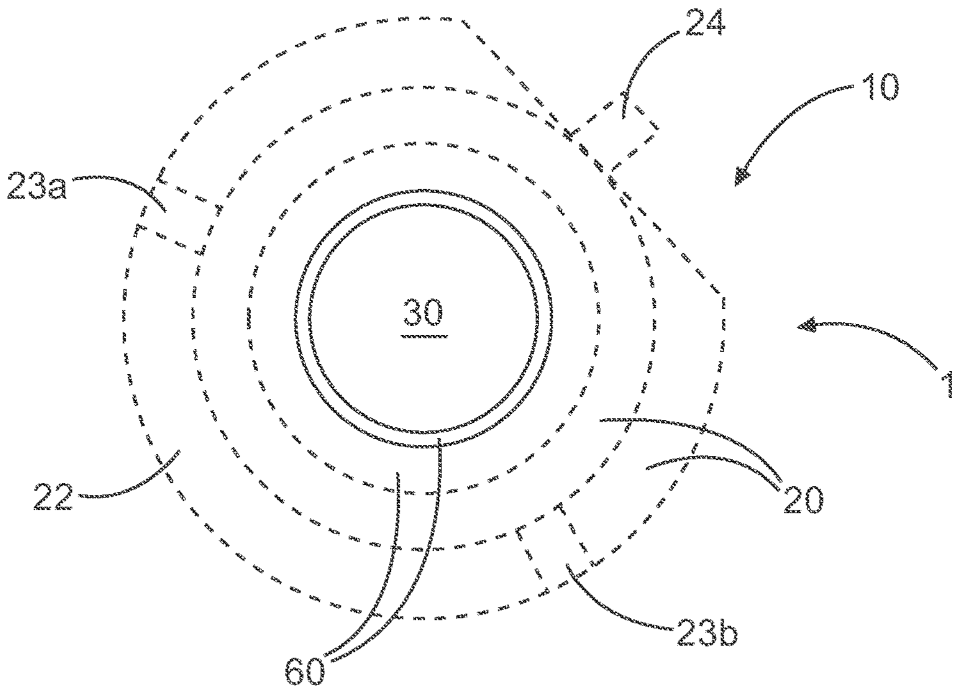
FIG. 5 shows a top view of the solid-state headlamp from FIG. 1.
Figure 6:
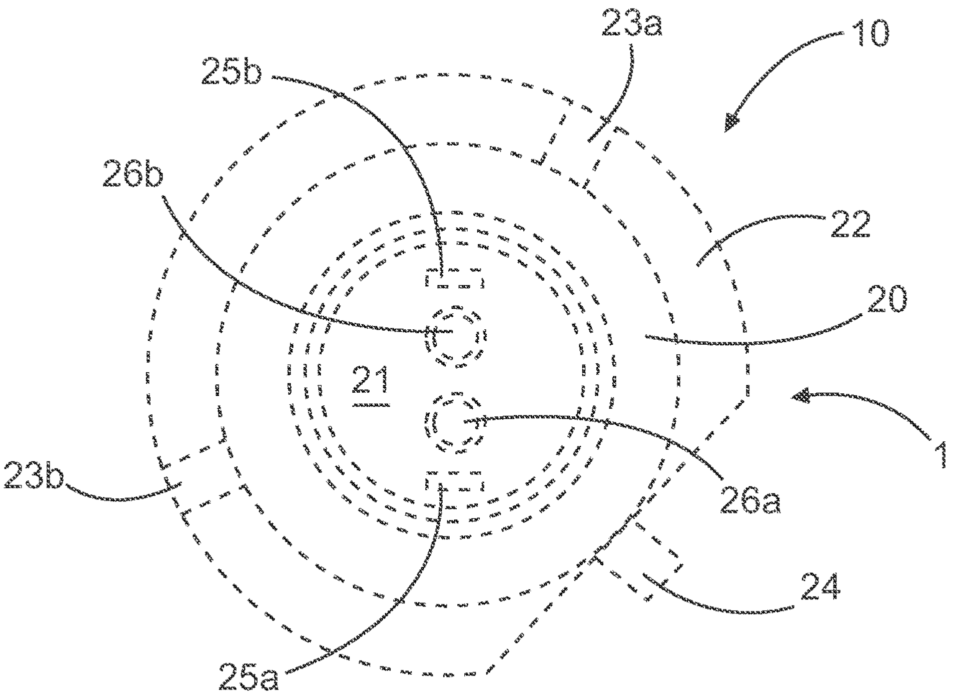
FIG. 6 shows a top view from below of the solid-state headlamp of FIG. 1.
Figure 7:
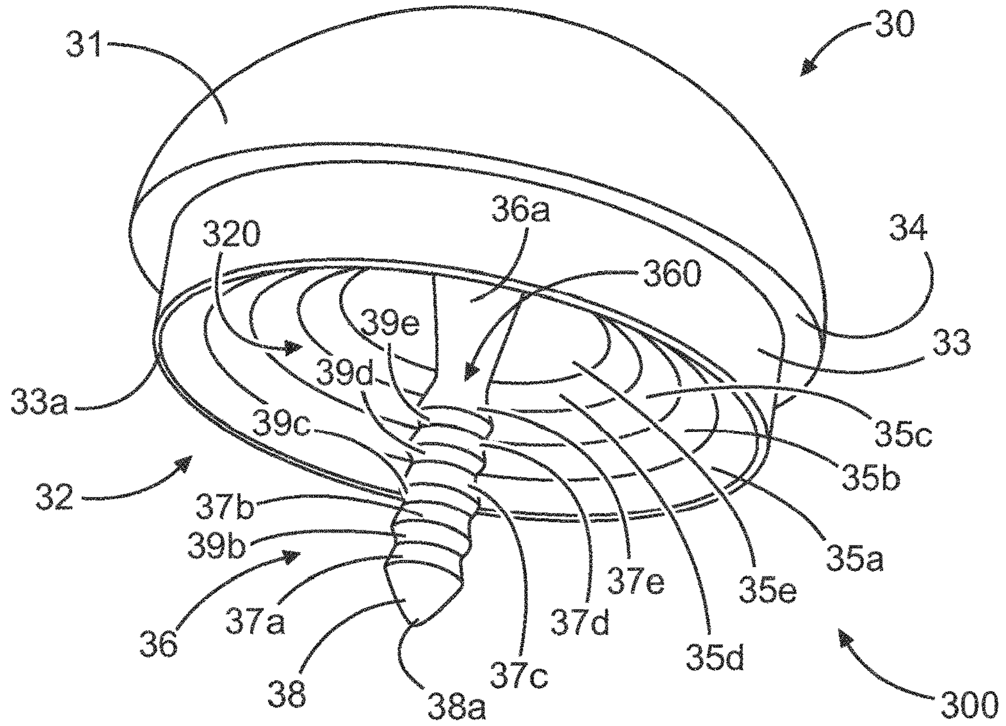
FIG. 7 shows a perspective view of a reflector optic of the solid-state headlamp of FIG. 1.

A mounting portion 61 whose diameter s6 is 11.5 mm is located at the front end, so that it can be fitted into the opening 43 at the proximal end of the light transmissive housing 40. A distal end face 65 is configured to receive the support member 50 with its rear side. By maximizing the contact area, heat can be efficiently dissipated from the LED chips 72. Bores 67*a*, 67*b* are provided in the distal end face 65 to receive current supply leads 57*a*, 57*b* for the drive circuitry 55 and the solid-state light sources 70 shown in FIG. 14. These have contact portions 58*a*, 58*b* formed in corresponding contact mounting holes 54*a*, 54*b* in the support member 50 (FIG. 15). The current supply leads contact the printed circuit board at the plus and minus terminals. In the socket 20 (see FIG. 24), they are connected to the contact tabs 25*a*, 25*b* via the bottom contact welding 26*a*, 26*b* as shown in FIG. 4. The current leads 57*a*, 57*b* may also be formed of copper and have a tin-plated surface coating for improved solderability and weldability. In this particular embodiment, their diameter may be 0.6 to 0.7 mm and their length 35 mm. The dimensions can be adapted to the specific requirements. However, they contribute to heat conduction by conducting heat from the printed circuit board to the socket contacts 26*a*, 26*b* and the contact tabs 25*a*, 25*b*.

Figure 22:
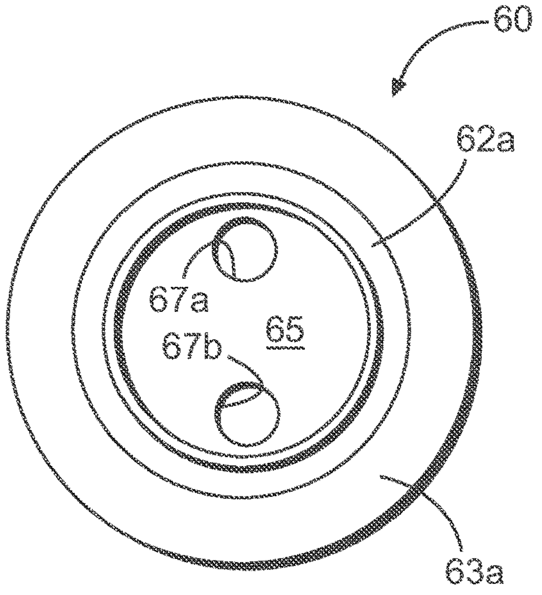
FIG. 22 shows a top view of the heat sink portion of FIG. 18.
Figure 23:
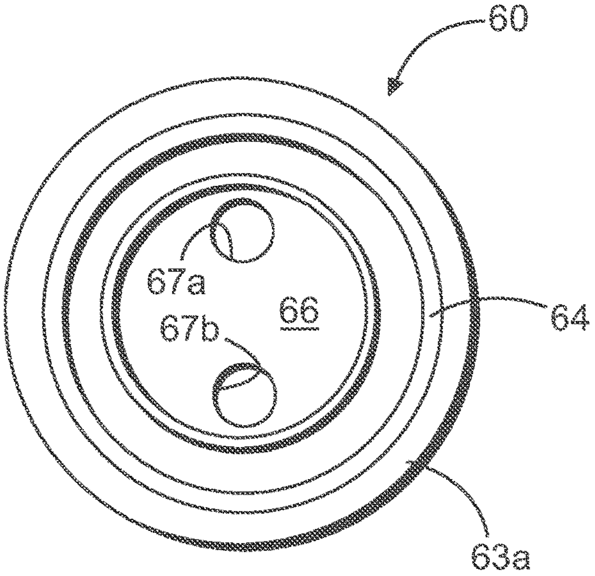
FIG. 23 shows a bottom view of the heat sink portion of FIG. 18.
Figure 24:
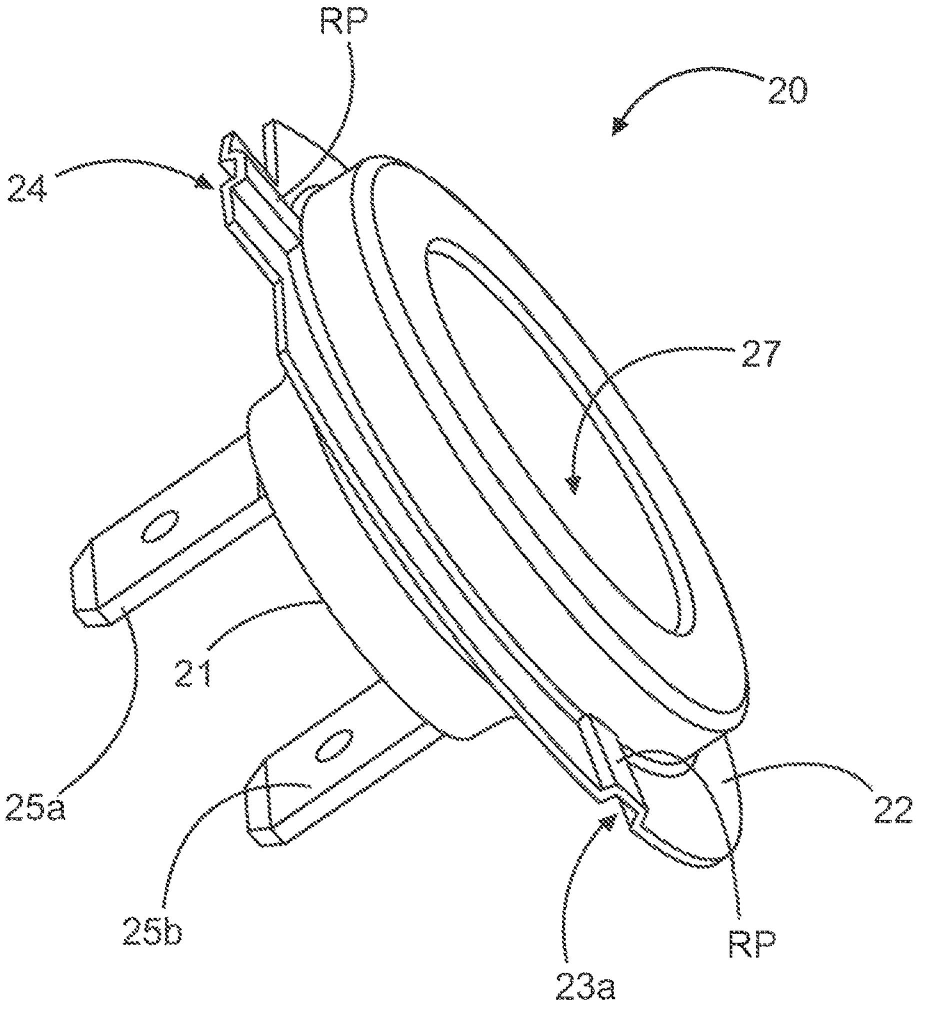
FIG. 24 shows in a perspective view, a socket or mounting portion of the solid state headlamp of FIG. 1.

A mounting portion 64 is provided at the opposite end of the heat sink portion 60, which is configured to be received and secured in an accommodation space 27 of the socket 20 (see FIG. 24). In FIGS. 22 and 23, it can be seen that corresponding bores 67*a*, 67*b* are also provided in the proximal end face 66 through which the current supply leads 57*a*, 57*b* are passed.

In the distal base portion 62 of the heat sink section 60, the annular circumferential cooling ribs 62*a*-62*b* are formed on a hollow cylindrical portion 620 which, as indicated in FIG. 4, has a cylindrical bore 621 inside which extends along the longitudinal axis to near the distal end, i.e., the mounting portion 61 with the distal end face 65, to which the support member 50 is attached. The inner diameter of this bore may be 9 mm. The bore 621 permits particularly effective rear cooling of the distal end face 61 in combination with the slots formed by a heat transfer opening 631 between the cooling ribs 63*a*-63*c*. It is provided in the proximal base portion 63 and is bounded by lateral walls 631. The heat transfer opening 631 allows air flow through the interior of the heat sink portion 60 and cooling of the bore 621. This structure allows particularly effective heat transfer from the support member and solid-state light sources 70 toward the socket 20 for dissipation of heat to the external environment and adjacent components. In this embodiment, the length l of the heat sink portion 60 excluding the mounting portion 64 amounts to 20.5 mm, which is thus comparatively long.

The socket 20 is shown in perspective in FIG. 24. In addition to contact tabs 25*a*, 25*b* and an insulating socket part 21, it has, for the special H7 type lamp with PX26d socket type, an annular flange portion 22 with radial mounting lugs 23*a*, 23*b* and 24 arranged thereon, adapted to be coupled to a vehicle-mounted reflector socket of a reflector 200 receiving the lamp.

Example 1: A reflector optical system including a reflector body having a rotational symmetry about a longitudinal axis and including a first reflector optic portion having a substantially concave shape and a second reflector optic portion extending along the longitudinal axis, the first reflector optic portion facing the second reflector optic portion, wherein the first reflector optic portion includes a plurality of first reflective surfaces and the second reflector optic portion includes a plurality of second reflective surfaces in spaced light-receiving relation to the plurality of first reflective surfaces.

Example 2: A system including the reflector optical system of example 1 and a plurality of solid state light sources arranged on a support member, wherein the support member defines a plane perpendicular to the longitudinal axis of the reflector body, and wherein the plurality of solid state light sources are configured, when being operated by a drive circuitry in operative electrical association with the support member, to cause the reflector optical system to emit a luminous flux of at least 1350 lumens+/−10% when energized with a 13.2 Volt reference voltage, or a luminous flux of at least 1600 lumens+/−10% when energized with a 28 Volt reference voltage.

Example 3: The system of Example 2, wherein a distance between the free end of the pin and the support member and/or the plurality of solid state light sources arranged thereon amounts to no more than 1 mm.

Example 4: The system of Example 2, wherein the combination fits a spatial envelope according to FIG. 2 on a respective one of pages 35, 39, 43, 50, and 70 of Addendum 36 of ECE Regulation 37 for any lamp chosen from the group of lamps consisting of H7, H8, H9, H11 and H16 lamps.

Example 5: The system of Example 2, wherein the each of the plurality of solid state light sources is each provided with an optical lens focusing the light emitted by the light sources in direction along the longitudinal axis with an opening angle of no more than 10 degrees, or no more than 20 degrees.

Example 6: The system of Example 2, wherein in a radiation pattern of the light emitted by the second reflective surfaces, and generated in a plane defined by the longitudinal axis and an axis in a reference plane orthogonal to the longitudinal axis, an angle of radiation (γ) emitted at a luminous intensity amounting to at least half of a maximum luminous intensity in the plane is at least 40 degrees.

Example 7: The system of Example 2, wherein the second reflector optic portion is in register with a light-transmissive housing defined on a lamp body supporting the reflector optical system and the light sources at opposing ends thereof.

Example 8: The system of Example 2, further comprising a heat sink portion, wherein the support member is positioned on an end face of the heat sink portion which faces the reflector body along the longitudinal axis.

Example 9: The system of Example 8, further comprising the heat sink portion is formed as an integral piece including a plurality of annular cooling ribs.

Example 10: The system of Example 2, wherein the reflector body is formed of an optical glass or a heat and/or UV resistant molded plastic material.

Although a preferred embodiment of the present disclosure has been described, it is understood that various changes, adaptations and modifications may be made thereto without departing from the spirit of the disclosure and the scope of protection of the appended claims. Therefore, the scope of protection of the disclosure should not be determined by reference to the above description, but should instead be determined by reference to the appended claims along with their full scope of protection of equivalents. Further, it is understood that the appended claims do not necessarily encompass the broadest scope of protection of the disclosure that the applicant is entitled to claim, or the only way in which the disclosure can be claimed, or that all of the features listed are necessary.

The invention claimed is:

1. A reflector optical system comprising:

a reflector body having a rotational symmetry about a longitudinal axis and including a first reflector optic portion having a substantially concave shape; and a second reflector optic portion extending along the longitudinal axis, the first reflector optic portion facing the second reflector optic portion, wherein the first reflector optic portion includes a plurality of first reflective surfaces and the second reflector optic portion includes a plurality of second reflective surfaces in spaced light-receiving relation to the plurality of first reflective surfaces, wherein the first reflective surfaces are conical or skirt shaped, and are arranged concentric about the longitudinal axis, and wherein, in the first reflector optic portion, an inclination of the conical or skirt shaped first reflective surfaces, with respect to the longitudinal axis, increases with increasing distance from the longitudinal axis.

2. The reflector optical system of claim 1, wherein the second reflector optic portion is a portion of a pin.

3. The reflector optical system of claim 1, wherein the plurality of first reflective surfaces has an annular shape.

4. The reflector optical system of claim 1, wherein the first reflective surfaces and/or the second reflective surfaces comprise a highly reflective surface coating or surface finish having a reflectivity of at least 90%.

5. The reflector optical system of claim 4, wherein the highly reflective surface coating or surface finish has a reflectivity of at least 95%.

6. The reflector optical system of claim 1, wherein the skirt shaped first reflective surfaces are a portion of a conical surfaces.

7. The reflector optical system of claim 1, wherein the first reflective surfaces and/or the second reflective surfaces have an annular shape.

8. The reflector optical system of claim 1, wherein each of the second reflective surfaces includes an inclination angle with respect to the longitudinal axis, and wherein an inclination angle decreases with increasing distance from the first reflector optics portion along the longitudinal axis.

9. The reflector optical system of claim 1, wherein the second reflector optic portion including the second reflective surfaces is arranged rotationally symmetric about the longitudinal axis.

10. The reflector optical system of claim 9, wherein each of the second reflective surfaces is shaped as a truncated cone, and wherein the second reflective surfaces are aligned along the second reflector optic portion in a sequential fashion.

11. The reflector optical system of claim 1, wherein respective numbers of first reflective surfaces and of the second reflective surfaces are equal.

12. The reflector optical system of claim 1, wherein the reflector body and a pin are integral parts of a monolithic body.

13. The reflector optical system of claim 1, wherein the reflector body has a diameter perpendicular to the longitudinal axis of not more than 15 mm.

14. The reflector optical system of claim 1, wherein the second reflector optic portion is bound by an annular flange portion having an end face defining a plane perpendicular to the longitudinal axis, wherein the second reflector optic portion formed by the second reflective surfaces extends from a tip portion of a pin at least up to an intersection of the second reflector optic portion with the plane defined by the end face, and wherein a length of the second reflector optic portion is between about 4.0 mm and about 5.9 mm, inclusive.

15. The reflector optical system of claim 1, wherein the second reflector optic portion has, at a tip portion at its free end, one or more third reflective surfaces oriented away from the first reflector optic portion, the third reflective surfaces configured to directly receive light incident in a direction parallel to the longitudinal axis and reflect the light in a direction substantially perpendicular to and away from the longitudinal axis.

16. The reflector optical system of claim 15, wherein a single third reflective surface is provided having a shape of a cone reversed in orientation as compared with that of the plurality of second reflective surfaces.

17. The reflector optical system of claim 16, wherein inclinations of the first reflective surfaces with respect to the longitudinal axis are in a range between 60° degrees and 70° degrees, inclusive, and/or wherein inclinations of the second reflective surfaces with respect to the longitudinal axis are in a range between 18° degrees and 25° degrees, inclusive, and/or wherein inclinations of the third reflective surfaces with respect to the longitudinal axis are in a range between 40° degrees and 50° degrees, inclusive.

18. A system comprising:

the reflector optical system of claim 1; and a plurality of solid state light sources arranged on a support member, wherein the support member defines a plane perpendicular to the longitudinal axis of the reflector body, and wherein the plurality of solid state light sources are configured, when being operated by a drive circuitry in operative electrical association with the support member, to cause the reflector optical system to emit a luminous flux of at least 1350 lumens+/−10% when energized with a 13.2 Volt reference voltage, or a luminous flux of at least 1600 lumens+/−10% when energized with a 28 Volt reference voltage.

19. A reflector optical system comprising:

a reflector body having a rotational symmetry about a longitudinal axis and including a first reflector optic portion having a substantially concave shape; and a second reflector optic portion extending along the longitudinal axis, the first reflector optic portion facing the second reflector optic portion, wherein the first reflector optic portion includes a plurality of first reflective surfaces and the second reflector optic portion includes a plurality of second reflective surfaces in spaced light-receiving relation to the plurality of first reflective surfaces, wherein each of the second reflective surfaces includes an inclination angle with respect to the longitudinal axis, and wherein an inclination angle decreases with increasing distance from the first reflector optics portion along the longitudinal axis.

20. A reflector optical system comprising:

a reflector body having a rotational symmetry about a longitudinal axis and including a first reflector optic portion having a substantially concave shape; and a second reflector optic portion extending along the longitudinal axis, the first reflector optic portion facing the second reflector optic portion, wherein the first reflector optic portion includes a plurality of first reflective surfaces and the second reflector optic portion includes a plurality of second reflective surfaces in spaced light-receiving relation to the plurality of first reflective surfaces, wherein the second reflector optic portion is bound by an annular flange portion having an end face defining a plane perpendicular to the longitudinal axis, wherein the second reflector optic portion formed by the second reflective surfaces extends from a tip portion of a pin at least up to an intersection of the second reflector optic portion with the plane defined by the end face, and wherein a length of the second reflector optic portion is between about 4.0 mm and about 5.9 mm, inclusive.

* * * * *